(12) United States Patent
Sugiyama et al.

(10) Patent No.: US 8,797,437 B2
(45) Date of Patent: Aug. 5, 2014

(54) SOLID-STATE IMAGING DEVICE

(75) Inventors: Yukinobu Sugiyama, Hamamatsu (JP); Tasuku Joboji, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 66 days.

(21) Appl. No.: 13/699,308

(22) PCT Filed: May 27, 2011

(86) PCT No.: PCT/JP2011/062272
§ 371 (c)(1), (2), (4) Date: Nov. 21, 2012

(87) PCT Pub. No.: WO2011/149080
PCT Pub. Date: Dec. 1, 2011

(65) Prior Publication Data
US 2013/0063640 A1   Mar. 14, 2013

(30) Foreign Application Priority Data

May 28, 2010 (JP) .................................. 2010-122886
May 28, 2010 (JP) .................................. 2010-122890

(51) Int. Cl.
*H04N 3/14* (2006.01)
*H04N 5/335* (2011.01)

(52) U.S. Cl.
USPC ............ 348/302; 348/296; 348/301; 348/308

(58) Field of Classification Search
CPC ....... H04N 5/335; H04N 5/341; H04N 5/345; H04N 3/3454; H04N 5/3742
USPC ........ 348/294, 296, 300–302, 308; 250/208.1
See application file for complete search history.

(56) References Cited

U.S. PATENT DOCUMENTS

| 7,608,516 | B2 * | 10/2009 | Meynants | 438/308 |
| 7,746,399 | B2 * | 6/2010 | Itoh et al. | 348/302 |
| 8,670,042 | B2 * | 3/2014 | Joboji et al. | 348/226.1 |
| 2005/0082461 | A1 * | 4/2005 | Bock | 250/208.1 |
| 2010/0033611 | A1 * | 2/2010 | Lee et al. | 348/302 |
| 2012/0099010 | A1 | 4/2012 | Sugiyama et al. | |

FOREIGN PATENT DOCUMENTS

| JP | H10-022918 | 1/1998 |
| JP | 2007-228460 | 9/2007 |
| JP | 3995959 | 10/2007 |
| JP | 2009-283599 | 12/2009 |
| WO | 2006/048987 | 5/2006 |

* cited by examiner

*Primary Examiner* — Daniel M Pasiewicz
(74) *Attorney, Agent, or Firm* — Drinker Biddle & Reath LLP

(57) ABSTRACT

A solid-state imaging device 1 includes a light receiving section 10, a first row selecting section 20, a second row selecting section 30, and the like. The first row selecting section 20 causes each pixel unit of any m1-th row in the light receiving section 10 to output data corresponding to an amount of charge generated in a photodiode to a readout signal line $L1_n$. The second row selecting section 30 causes each pixel unit of any m2-th row in the light receiving section 10 to output data corresponding to an amount of charge generated in a photodiode to a readout signal line $L2_n$. The solid-state imaging device 1 causes each pixel unit of any m3-th row in the light receiving section 10 to accumulate charge generated in a photodiode in a charge accumulating section. m1 and m2 are different from each other.

10 Claims, 23 Drawing Sheets

(b)

(a)

SOLID-STATE IMAGING DEVICE

TECHNICAL FIELD

The present invention relates to a solid-state imaging device.

BACKGROUND ART

A solid-state imaging device includes a light receiving section where M×N pixel units $P_{1,1}$ to $P_{M,N}$ each including a photodiode and a charge accumulating section are two-dimensionally arrayed in M rows and N columns, a row selecting section that causes each pixel unit $P_{m,n}$ in a light receiving section to accumulate charge generated in the photodiode during a given period in its charge accumulating section, and to output data corresponding to an amount of the charge accumulated in each pixel unit $P_{m,n}$ in every row, and a readout section for which the data output from each pixel unit $P_{m,n}$ in the light receiving section is input and from which data corresponding to an amount of charge generated in the photodiode of each pixel unit $P_{m,n}$ is output. Also, in some cases, the solid-state imaging device further includes an AD conversion section that analog/digital-converts the data output from the readout section to output a digital value.

Such a solid-state imaging device is capable of detecting an intensity of light reaching each pixel unit $P_{m,n}$ in its light receiving section, to perform imaging. Further, in recent years, not only imaging, but an attempt has been made to perform optical communication by using such a solid-state imaging device. For example, a solid-state imaging device of the invention disclosed in Patent Literature 1 has a plurality of means for reading out data from each pixel unit, and is capable of performing imaging by reading out data by every pixel unit with the first readout means among those. Further, the solid-state imaging device adds current signals generated from photodiodes of specific one pixel unit, or two or more pixel units to output the signal with the second readout means, so that the solid-state imaging device is capable of receiving an optical signal.

CITATION LIST

Patent Literature

Patent Literature 1: Japanese Patent No. 3995959

SUMMARY OF INVENTION

Technical Problem

In the solid-state imaging device of the invention disclosed in Patent Literature 1, because the data to be read out by the first readout means is image data, a data readout speed by the first readout means is, for example, several tens of fps (frames per second). On the other hand, because the data to be read out by the second readout means is communication data, a data readout speed by the second readout means is, for example, several tens of kbps (kilo bits per second).

The present inventors have found that the following problems occur in such a solid-state imaging device that performs imaging and optical communication. The solid-state imaging device of the invention disclosed in Patent Literature 1 is intended to be used for a case where an optical signal source may be moved. In this case, the position of the optical signal source is specified on the basis of image data read out by the first readout means, and data from the pixel units at the specified position in the image are read out as communication data by the second readout means.

In the case where the position of the optical signal source is tracked in this way, from a given pixel unit, image data are read out by the first readout means before a given time t, and communication data are read out by the second readout means on and after the time t. Further, from a given pixel unit, no data are read out by either of the first readout means or the second readout means before a given time t, and communication data are read out by the second readout means on and after the time t. That is, in the pixel unit, the charge accumulating time before the time t is longer than the charge accumulating time on and after the time t. However, because the communication data initially read out by the second readout means immediately after the time t correspond to an amount of the charge finally accumulated over a long period immediately before the time t, the communication data may be wrong values in some cases. Under such circumstances, the solid-state imaging device is not able to accurately receive an optical signal from the optical signal source.

The present invention has been achieved in order to solve the above-described problems. An object of the present invention is to provide a solid-state imaging device for optical communication, which is capable of accurately receiving an optical signal from the optical signal source even in a case where the position of an optical signal source is tracked.

Solution to Problem

A solid-state imaging device according to the present invention includes (1) a light receiving section where M×N pixel units $P_{1,1}$ to $P_{M,N}$ each including a photodiode that generates charge of an amount according to an incident light amount, a charge accumulating section in which the charge is accumulated, a first switch for outputting data corresponding to an accumulated charge amount in the charge accumulating section, and a second switch for outputting data corresponding to the accumulated charge amount in the charge accumulating section are two-dimensionally arrayed in M rows and N columns, (2) a first row selecting section which selects any m1-th row in the light receiving section, and outputs a control signal to each pixel unit $P_{m1,n}$ of the m1-th row, thereby discharging a junction capacitance section of the photodiode, accumulating the charge generated in the photodiode in the charge accumulating section, and outputting data corresponding to the accumulated charge amount in the charge accumulating section to a readout signal line $L1_n$ by closing the first switch, (3) a second row selecting section which selects any m2-th row different from the m1-th row in the light receiving section, and outputs a control signal to each pixel unit $P_{m2,n}$ of the m2-th row, thereby discharging a junction capacitance section of the photodiode, accumulating the charge generated in the photodiode in the charge accumulating section, and outputting data corresponding to the accumulated charge amount in the charge accumulating section to a readout signal line $L2_n$ by closing the second switch, (4) a first readout section which is connected to N readout signal lines $L1_1$ to $L1_N$, for which data output from each pixel unit $P_{m1,n}$ of the m1-th row in the light receiving section selected by the first row selecting section to the readout signal line $L1_n$ is input thereto, and from which data corresponding to an amount of the charge generated in the photodiode of each pixel unit $P_{m1,n}$ of the m1-th row is output, and (5) a second readout section which is connected to N readout signal lines $L2_1$ to $L2_N$, for which data output from each pixel unit $P_{m2,n}$ of the m2-th row in the light receiving section selected by the second row selecting section to the readout signal line $L2_n$ is input thereto, and from which data corresponding to an amount of the charge generated in the photodiode of each pixel unit $P_{m2,n}$ of the m2-th row is output. Moreover, the solid-state imaging device according to the present invention selects any m3-th row in the light receiving section, and outputs a control signal to each pixel unit $P_{m3,n}$ of the m3-th row, thereby discharging a junction capacitance section of the photodiode, and the first row selecting section and the first readout section, and the second row selecting section and the second readout section operate in parallel with each other (provided that M and N are integers not less than 2, m1 and m2 are integers not less than 1 and not more than M, which are different from each other, m3 is an integer not less than 1 and not more than M, and n is an integer not less than 1 and not more than N).

In the solid-state imaging device according to the present invention, any m1-th row in the light receiving section is selected by the first row selecting section, and in each pixel unit $P_{m1,n}$ of the m1-th row, the junction capacitance section of the photodiode is discharged, the charge generated in the photodiode is accumulated in the charge accumulating section, and the data corresponding to the accumulated charge amount in the charge accumulating section is output to the readout signal line $L1_n$ by closing the first switch. In the first readout section which is connected to each readout signal $L1_n$, data output from each pixel unit $P_{m1,n}$ of the m1-th row in the light receiving section selected by the first row selecting section to the readout signal line $L1_n$ is input thereto, and data corresponding to the amount of charge generated in the photodiode of each pixel unit $P_{m1,n}$ of the m1-th row is output.

On the other hand, any m2-th row in the light receiving section is selected by the second row selecting section, and in each pixel unit $P_{m2,n}$ of the m2-th row, the junction capacitance section of the photodiode is discharged, the charge generated in the photodiode is accumulated in the charge accumulating section, and the data corresponding to the accumulated charge amount in the charge accumulating section is output to a readout signal line $L2_n$ by closing the second switch. In the second readout section which is connected to each readout signal line $L2_n$, data output from each pixel unit $P_{m2,n}$ of the m2-th row in the light receiving section selected by the second row selecting section to the readout signal line $L2_n$ is input thereto, and data corresponding to the amount of charge generated in the photodiode of each pixel unit $P_{m2,n}$ of the m2-th row is output.

Rows different from each other in the light receiving section are selected by the first row selecting section and the second row selecting section. Then, the first row selecting section and the first readout section, and the second row selecting section and the second readout section operate in parallel with each other. Thereby, for example, image data by the first row selecting section and the first readout section is obtained, and communication data by the second row selecting section and the second readout section is obtained.

Further, in the solid-state imaging device according to the present invention, any m3-th row in the light receiving section is selected, and in each pixel unit $P_{m3,n}$ of the m3-th row, the junction capacitance section of the photodiode is discharged.

In the solid-state imaging device according to the present invention, it is preferable that the first row selecting section or the second row selecting section select any m3-th row different from the m1-th row and the m2-th row in the light receiving section, and outputs a control signal to each pixel unit $P_{m3,n}$ of the m3-th row, thereby discharging the junction capacitance section of the photodiode. However, m1, m2, and m3 are integers not less than 1 and not more than M, which are different from each other. In the solid-state imaging device according to the present invention, any m3-th row different from the m1-th row and the m2-th row in the light receiving section is selected by the first row selecting section or the second row selecting section, and in each pixel unit $P_{m3,n}$ of the m3-th row, the junction capacitance section of the photodiode is discharged.

It is preferable that the solid-state imaging device according to the present invention further include switching means for switching between the first row selecting section and the second row selecting section, to determine any one of the first row selecting section and the second row selecting section as a row selecting section which outputs a control signal to each pixel unit $P_{m3,n}$ of the m3-th row in the light receiving section, thereby discharging the junction capacitance section of the photodiode.

It is preferable that, in the solid-state imaging device according to the present invention, (a) the first row selecting section include M latch circuits, and when data held in an m1-th latch circuit among the M latch circuits is a significant value, the first row selecting section output a control signal to each pixel unit $P_{m1,n}$ of the m1-th row, (b) the second row selecting section include M latch circuits, and when data held in an m2-th latch circuit among the M latch circuits is a significant value, the second row selecting section output a control signal to each pixel unit $P_{m2,n}$ of the m2-th row, and (c) any row selecting section of the first row selecting section and the second row selecting section output a control signal to each pixel unit $P_{m3,n}$ of the m3-th row when data held in an m3-th latch circuit among the M latch circuits of the other row selecting section is an insignificant value.

In the solid-state imaging device according to the present invention, it is preferable that the M latch circuits of each of the first row selecting section and the second row selecting section be cascade-connected in order of the rows, to compose a shift register, and M-bit data be serial-input to a latch circuit at the first stage in the shift register, to cause each latch circuit to hold data.

In the solid-state imaging device according to the present invention, it is preferable that (a) the first row selecting section sequentially output the control signals at a constant time interval to a plurality of rows corresponding to latch circuits with holding data of significant values among the M latch circuits included in the first row selecting section, and (b) the second row selecting section sequentially output the control signals at a constant time interval to a plurality of rows corresponding to latch circuits with holding data of significant values among the M latch circuits included in the second row selecting section.

It is preferable that the solid-state imaging device according to the present invention further include a third row selecting section which selects any m3-th row in the light receiving section, and outputs a control signal to each pixel unit $P_{m3,n}$ of the m3-th row, thereby discharging a junction capacitance section of the photodiode. In the solid-state imaging device according to the present invention, any m3-th row in the light receiving section is selected by the third row selecting section, and in each pixel unit $P_{m3,n}$ of the m3-th row, the junction capacitance section of the photodiode is discharged It is preferable that, in the solid-state imaging device according to the present invention, (a) the first row selecting section include M latch circuits, and when data held in an m1-th latch circuit among the M latch circuits is a significant value, the first row selecting section output a control signal to each pixel unit $P_{m1,n}$ of the m1-th row, (b) the second row selecting section include M latch circuits, and when data held in an m2-th latch circuit among the M latch circuits is a significant value, the second row selecting section output a control signal to each pixel unit $P_{m2,n}$ of the m2-th row, and (c) the third row selecting section include M latch circuits, and when data held in an m3-th latch circuit among the M latch circuits is a significant value, the third row selecting section output a control signal to each pixel unit $P_{m3,n}$ of the m3-th row.

In the solid-state imaging device according to the present invention, it is preferable that the M latch circuits of each of the first row selecting section, the second row selecting section, and the third row selecting section be cascade-connected in order of the rows, to compose a shift register, and M-bit data be serial-input to a latch circuit at the first stage in the shift register, to cause each latch circuit to hold data.

In the solid-state imaging device according to the present invention, it is preferable that (a) the first row selecting section sequentially output the control signals at a constant time interval to a plurality of rows corresponding to latch circuits with holding data of significant values among the M latch circuits included in the first row selecting section, and (b) the second row selecting section sequentially output the control signals at a constant time interval to a plurality of rows corresponding to latch circuits with holding data of significant values among the M latch circuits included in the second row selecting section.

Advantageous Effects of Invention

The solid-state imaging device of the present invention is capable of accurately receiving an optical signal from the optical signal source even in a case where the position of an optical signal source is tracked.

DESCRIPTION OF EMBODIMENTS

Figure 1:
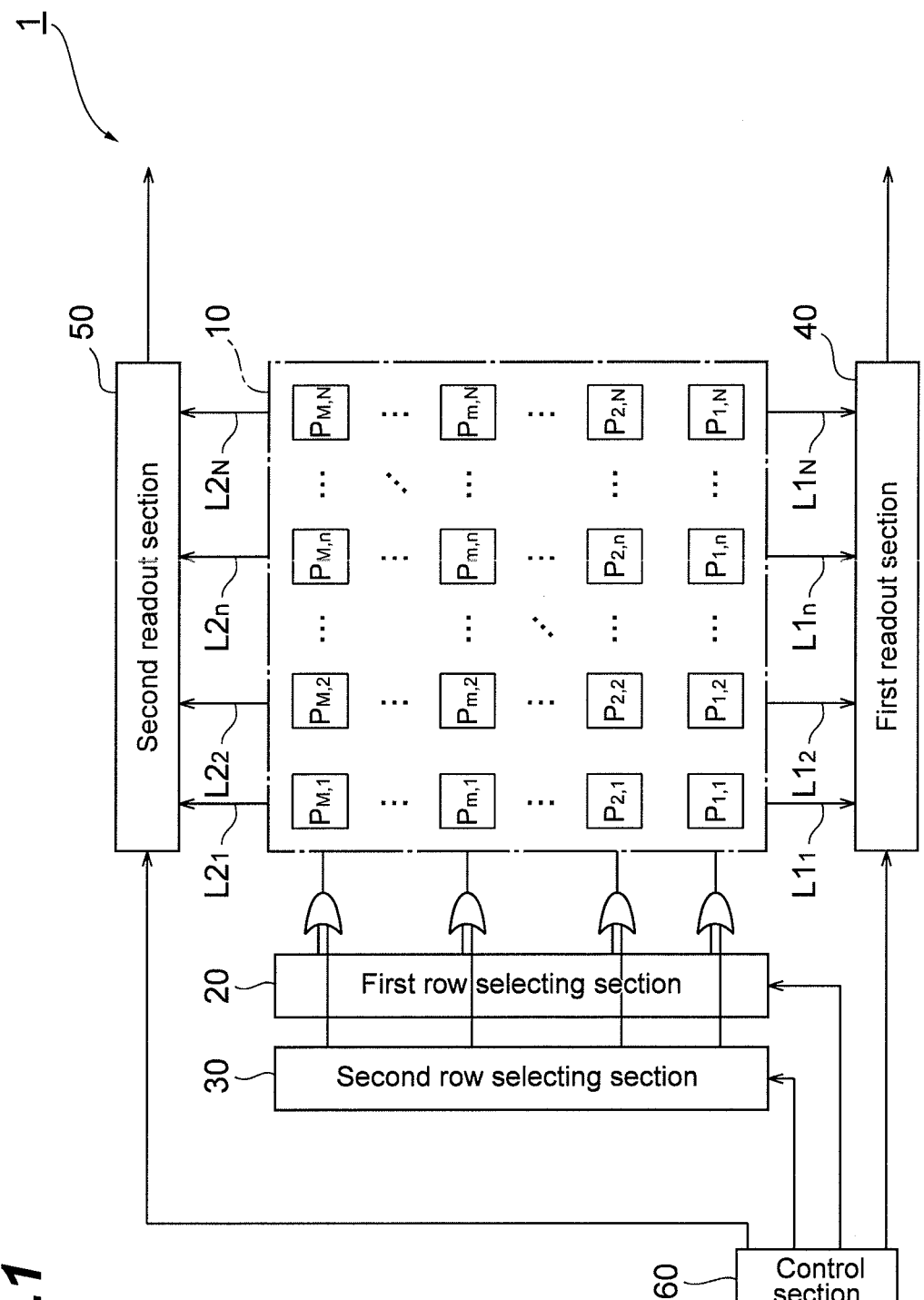
FIG. 1 is a diagram showing a schematic configuration of a solid-state imaging device 1 according to a first embodiment.

Hereinafter, embodiments of the present invention will be described in detail with reference to the accompanying drawings. Also, the same components will be denoted with the same reference numerals in the description of the drawings, and overlapping description will be omitted.

(First Embodiment)

FIG. 1 is a diagram showing a schematic configuration of a solid-state imaging device 1 according to a first embodiment. The solid-state imaging device 1 shown in this figure includes a light receiving section 10, a first row selecting section 20, a second row selecting section 30, a first readout section 40, a second readout section 50, and a control section 60.

The light receiving section 10 includes M×N pixel units $P_{1,1}$ to $P_{M,N}$. The M×N pixel units $P_{1,1}$ to $P_{M,N}$ have a common configuration, and these are two-dimensionally arrayed in M rows and N columns. Each pixel unit $P_{m,n}$ is located in the m-th row and the n-th column. Here, M and N are integers not less than 2, and m is an integer not less than 1 and not more than M, and n is an integer not less than 1 and not more than N.

Each pixel unit $P_{m,n}$ has a photodiode that generates charge of an amount according to an incident light amount and a charge accumulating section in which the charge is accumulated. Each pixel unit $P_{m,n}$ is capable of discharging a junction capacitance section of the photodiode, accumulating charge generated in the photodiode in its charge accumulating section, and outputting data corresponding to the accumulated charge amount in the charge accumulating section to a readout signal line $L1_n$ or a readout signal line $L2_n$ on the basis of various control signals received via control signal lines from the first row selecting section 20 or the second row selecting section 30.

The first row selecting section 20 selects any m1-th row in the light receiving section 10, and outputs a control signal to each pixel unit $P_{m1,n}$ of the m1-th row, thereby discharging a junction capacitance section of the photodiode, accumulating the charge generated in the photodiode in the charge accumulating section, and outputting data corresponding to the accumulated charge amount in the charge accumulating section to the readout signal line $L1_n$.

The second row selecting section 30 selects any m2-th row in the light receiving section 10, and outputs a control signal to each pixel unit $P_{m2,n}$ of the m2-th row, thereby discharging a junction capacitance section of the photodiode, accumulating the charge generated in the photodiode in the charge accumulating section, and outputting data corresponding to the accumulated charge amount in the charge accumulating section to the readout signal line $L2_n$.

The first row selecting section 20 selects any m3-th row in the light receiving section 10, and outputs a control signal to each pixel unit $P_{m3,n}$ of the m3-th row, thereby discharging a junction capacitance section of the photodiode, and accumulating the charge generated in the photodiode in the charge accumulating section.

Here, m1, m2, and m3 are integers not less than 1 and not more than M, which are different from each other. The first row selecting section 20 and the second row selecting section 30 select rows different from each other in the light receiving section 10. The number of rows selected by each of the first row selecting section 20 and the second row selecting section 30 is arbitrary. However, the output of data is sequentially carried out with respect to every single row.

The first readout section 40 is connected to N readout signal lines $L1_1$ to $L1_N$, and data output from each pixel unit $P_{m1,n}$ of the m1-th row in the light receiving section 10 selected by the first row selecting section 20 to the readout signal line $L1_n$ is input thereto, and data corresponding to an amount of charge generated in the photodiode of each pixel unit $P_{m1,n}$ of the m1-th row is output therefrom.

The second readout section 50 is connected to N readout signal lines $L2_1$ to $L2_N$, data output from each pixel unit $P_{m2,n}$ of the m2-th row in the light receiving section 10 selected by the second row selecting section 30 to the readout signal line $L2_n$ is input thereto, and data corresponding to an amount of charge generated in the photodiode of each pixel unit P of the m2-th row is output therefrom.

The control section 60 controls respective operations of the first row selecting section 20, the second row selecting section 30, the first readout section 40, and the second readout section 50, to control the entire operation of the solid-state imaging device 1. The first row selecting section 20 and the first readout section 40, the second row selecting section 30 and the second readout section 50 are capable of operating in parallel with each other under the control of the control section 60.

Figure 2:
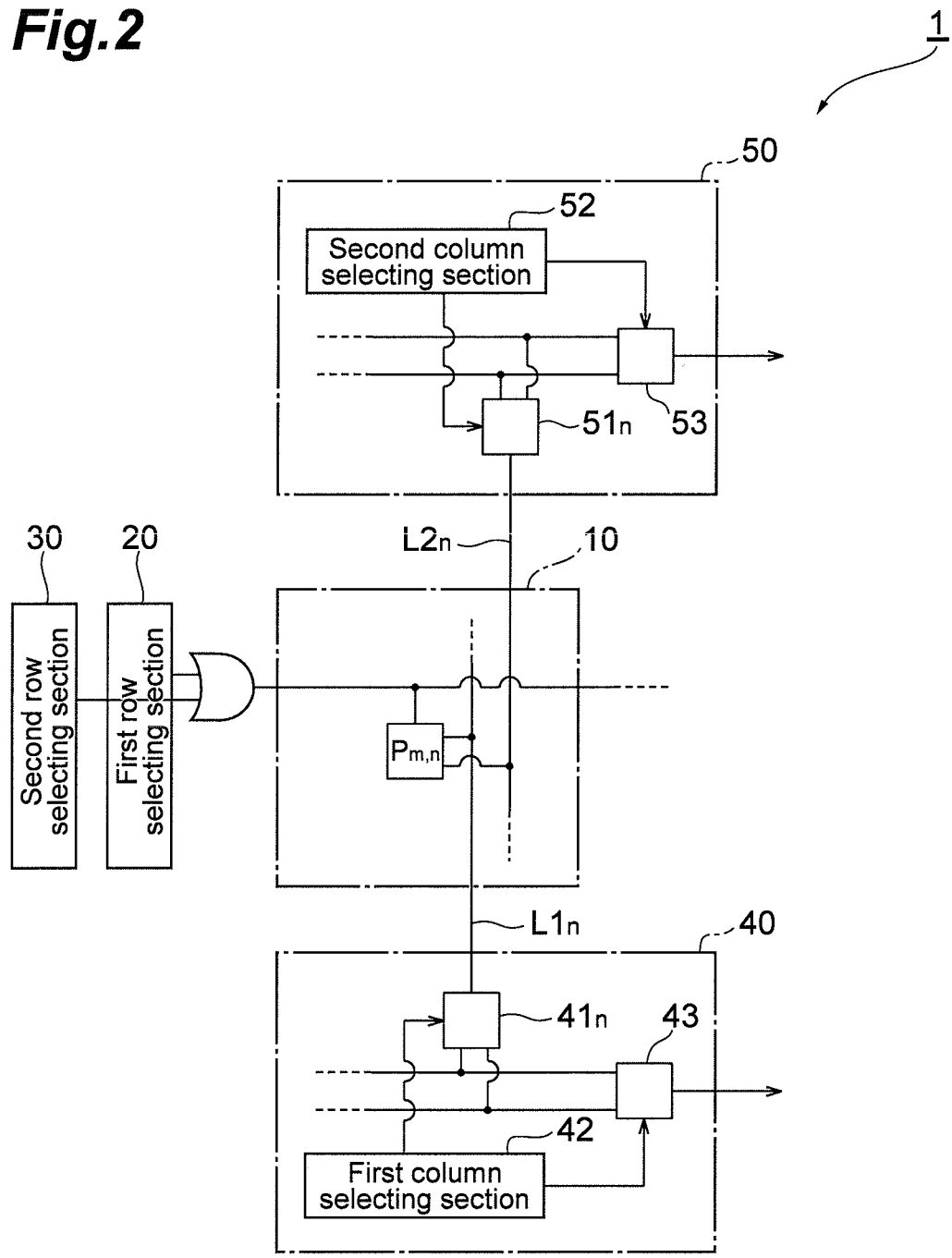
FIG. 2 is a diagram showing configurations of a first readout section 40 and a second readout section 50 of the solid-state imaging device 1 according to the first embodiment.

FIG. 2 is a diagram showing configurations of the first readout section 40 and the second readout section 50 of the solid-state imaging device 1 according to the first embodiment. In this figure, the pixel unit $P_{m,n}$ of the m-th row and the n-th column is shown as a representative of the M×N pixel units $P_{1,1}$ to $P_{M,N}$ in the light receiving section 10. Further, constitutional elements relating to the pixel unit $P_{m,n}$ are shown in each of the first readout section 40 and the second readout section 50.

The first readout section 40 includes N holding sections $41_1$ to $41_N$, a first column selecting section 42, and a difference arithmetic section 43. The N holding sections $41_1$ to $41_N$ have a common configuration. Each holding section $41_n$ is connected to M pixel units $P_{1,n}$ to $P_{M,n}$ of the n-th column in the light receiving section 10 via the readout signal line $L1_n$, and allows data output from the pixel unit $P_{m1,n}$ of the m1-th row selected by the first row selecting section 20 to the readout signal line $L1_n$ to be input thereto, to hold the data, and is capable of outputting the held data. Each holding section $41_n$ preferably allows data of signal components superimposed with noise components to be input thereto, to hold the data, and for allowing data of only noise components to be input thereto, to hold the data.

The N holding sections $41_1$ to $41_N$ are capable of sampling data at a same timing on the basis of various control signals received from the first column selecting section 42, to hold the sampled data, and sequentially output the held data. The difference arithmetic section 43 allows the data sequentially output from the respective N holding sections $41_1$ to $41_N$ to be input thereto, and subtracts the data of only noise components from the data of signal components superimposed with noise components, to output data corresponding to the signal components. The difference arithmetic section 43 may output the data corresponding to the signal components as analog data, or may have an AD conversion function to output digital data. In this way, the first readout section 40 is capable of outputting data corresponding to an amount of charge generated in the photodiode of each pixel unit $P_{m1,n}$ of the m1-th row.

The second readout section 50 includes N holding sections $51_1$ to $51_N$, a second column selecting section 52, and a difference arithmetic section 53. The N holding sections $51_1$ to $51_N$ have a common configuration. Each holding section $51_n$ is connected to M pixel units $P_{1,n}$ to $P_{M,n}$ of the n-th column in the light receiving section 10 via the readout signal line $L2_n$, and allows data output from the pixel unit $P_{m2,n}$ of the m2-th row selected by the second row selecting section 30 to the readout signal line $L2_n$ to be input thereto, to hold the data, and is capable of outputting the held data. Each holding section $51_n$ preferably allows data of signal components superimposed with noise components to be input thereto, to hold the data, and for allowing data of only noise components to be input thereto, to hold the data.

The N holding sections $51_1$ to $51_N$ are capable of sampling data at a same timing on the basis of various control signals received from the second column selecting section 52, to hold the sampled data, and sequentially output the held data. The difference arithmetic section 53 allows the data sequentially output from the respective N holding sections $51_1$ to $51_N$ to be input thereto, and subtracts the data of only noise components from the data of signal components superimposed with noise components, to output data corresponding to the signal components. The difference arithmetic section 53 may output the data corresponding to the signal components as analog data, or may have an AD conversion function to output digital data. In this way, the second readout section 50 is capable of outputting data corresponding to an amount of charge generated in the photodiode of each pixel unit $P_{m2,n}$ of the m2-th row.

Figure 3:
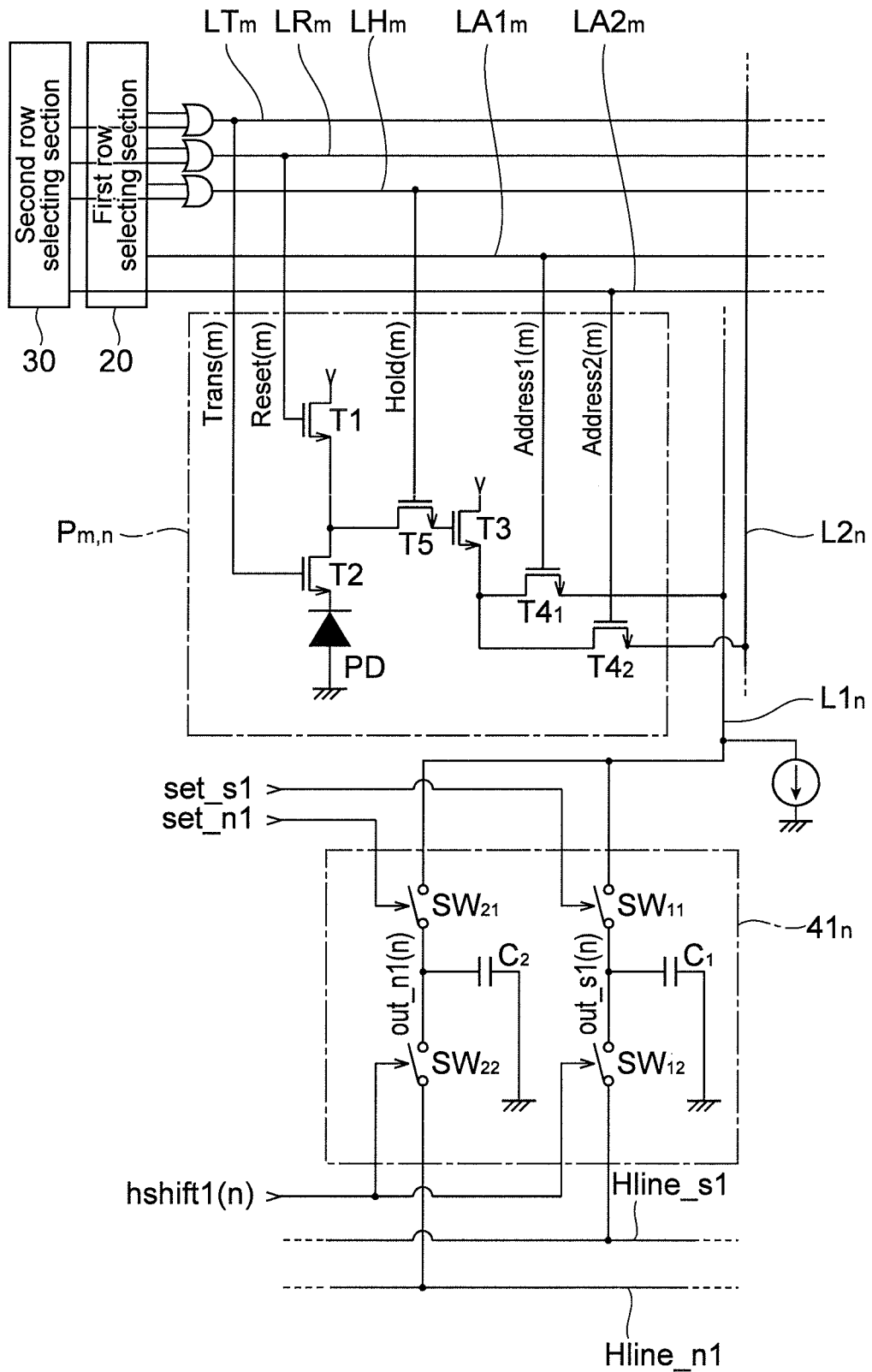
FIG. 3 is a diagram showing circuit configurations of a pixel unit $P_{m,n}$ and a holding section $41_n$ of the solid-state imaging device 1 according to the first embodiment.

FIG. 3 is a diagram showing circuit configurations of the pixel unit $P_{m,n}$ and the holding section $41_n$ of the solid-state imaging device 1 according to the first embodiment. In this figure as well, the pixel unit $P_{m,n}$ of the m-th row and the n-th column is shown as a representative of the M×N pixel units $P_{1,1}$ to $P_{M,N}$ in the light receiving section 10. Further, the holding section $41_n$ relating to the pixel unit $P_{m,n}$ is shown in the first readout section 40. In addition, the configuration of the holding section $51_n$ is the same as the configuration of the holding section $41_n$.

Each pixel unit $P_{m,n}$ is of the APS (Active Pixel Sensor) type, that includes a photodiode PD and 6 MOS transistors T1, T2, T3, $T4_1$, $T4_2$, and T5. As shown in this figure, the transistor T1, the transistor T2, and the photodiode PD are sequentially connected in series, and a reference voltage is input to the drain terminal of the transistor T1, and the anode terminal of the photodiode PD is grounded. The connection point between the transistor T1 and the transistor T2 is connected to the gate terminal of the transistor T3 via the transistor T5.

A reference voltage is input to the drain terminal of the transistor T3. The source terminal of the transistor T3 is connected to the respective drain terminals of the transistors $T4_1$ and $T4_2$. The source terminal of the transistor $T4_1$ of each pixel unit $P_{m,n}$ is connected to the readout signal line $L1_n$. The source terminal of the transistor $T4_2$ of each pixel unit $P_{m,n}$ is connected to the readout signal line $L2_n$. A constant current source is connected to the readout signal line $L1_n$ and the readout signal line $L2_n$, respectively.

The gate terminal of the transistor T2 for transfer in each pixel unit $P_{m,n}$ is connected to a control signal line $LT_m$, and a Trans(m) signal output from the first row selecting section 20 or the second row selecting section 30 is input thereto. The gate terminal of the transistor T1 for reset in each pixel unit $P_{m,n}$ is connected to a control signal line $LR_m$, and a Reset(m) signal output from the first row selecting section 20 or the second row selecting section 30 is input thereto. The gate terminal of the transistor T5 for hold in each pixel unit $P_{m,n}$ is connected to a control signal line $LH_m$, and a Hold(m) signal output from the first row selecting section 20 or the second row selecting section 30 is input thereto.

The gate terminal of the transistor $T4_1$ for output selection in each pixel unit $P_{m,n}$ is connected to a control signal line $LA1_m$, and an Address1(m) signal output from the first row selecting section 20 is input thereto. The gate terminal of the transistor $T4_2$ for output selection in each pixel unit $P_{m,n}$ is connected to a control signal line $LA2_m$, and an Address2(m) signal output from the second row selecting section 30 is input thereto. These control signals (a Reset(m) signal, a Trans(m) signal, a Hold(m) signal, an Address1(m) signal, and an Adress2(m) signal) are input in common to the N pixel units $P_{m,1}$ to $P_{m,N}$ of the m-th row.

The control signal line $LT_m$, the control signal line $LR_m$, and the control signal line $LH_m$ are provided to every row, and the control signals (a Reset(m) signal, a Trans(m) signal, a Hold(m) signal) giving instructions for discharge from each of the junction capacitance section of the photodiode PD in each pixel unit $P_{m,n}$ of the m-th row and the charge accumulating section, and for charge accumulation by the charge accumulating section are transmitted therethrough. The Reset (m) signal is a logical disjunction of a Reset1(m) signal output from the first row selecting section 20 and a Reset2(m) signal output from the second row selecting section 30. The Trans (m) signal is a logical disjunction of a Trans1(m) signal output from the first row selecting section 20 and a Trans2(m) signal output from the second row selecting section 30. Further, the Hold(m) signal is a logical disjunction of a Hold1 (m) signal output from the first row selecting section 20 and a Hold2 (m) signal output from the second row selecting section 30.

The control signal line $LA1_m$ and the control signal line $LA2_m$ are provided to every row, and the control signals (an Address1(m) signal, an Adress2(m) signal) for giving instructions for data output to the readout signal line $L1_n$ or the readout signal line $L2_n$ in each pixel unit $P_{m,n}$ of the m-th row are transmitted therethrough. Each control signal line $LA1_m$ is connected to the first row selecting section 20. Each control signal line $LA2_m$ is connected to the second row selecting section 30. The Address1(m) signal and the Adress2(m) signal are not raised to a high level simultaneously, and the transistor $T4_1$ and the transistor $T4_2$ do not move into an ON state simultaneously.

When the Reset(m) signal, the Trans(m) signal, and the Hold(m) signal are at a high level, the junction capacitance section of the photodiode PD is discharged, and further, a diffusion region (the charge accumulating section) connected to the gate terminal of the transistor T3 is discharged. When the Trans(m) signal is at a low level, the charge generated in the photodiode PD is accumulated in the junction capacitance section. When the Reset(m) signal is at a low level and the Trans(m) signal and the Hold(m) signal are at a high level, the charge accumulated in the junction capacitance section of the photodiode PD is transferred to the diffusion region (the charge accumulating section) connected to the gate terminal of the transistor T3 to be accumulated therein.

When the Address1(m) signal is at a high level, data (data of signal components superimposed with noise components) corresponding to an amount of the charge accumulated in the diffusion region (the charge accumulating section) connected to the gate terminal of the transistor T3 is output to the readout signal line $L1_n$ via the transistor $T4_1$, to be input to the holding section $41_n$ of the first readout section 40. That is, the transistor $T4_1$ operates as a first switch for outputting data corresponding to an accumulated charge amount in the charge accumulating section to the readout signal line $L1_n$. In addition, when the charge accumulating section is in a state of discharge, data of only noise components is output to the readout signal line $L1_n$ via the transistor $T4_1$.

When the Adress2(m) signal is at a high level, data (data of signal components superimposed with noise components) corresponding to an amount of the charge accumulated in the diffusion region (the charge accumulating section) connected to the gate terminal of the transistor T3 is output to the readout signal line $L2_n$ via the transistor $T4_2$, to be input to the holding section $51_n$ of the second readout section 50. That is, the transistor $T4_2$ operates as a second switch for outputting data corresponding to an accumulated charge amount in the charge accumulating section to the readout signal line $L2_n$. In addition, when the charge accumulating section is in a state of discharge, data of only noise components is output to the readout signal line $L2_n$ via the transistor $T4_2$.

Each holding section $41_n$ includes two capacitive elements $C_1$ and $C_2$, and four switches $SW_{11}$, $SW_{12}$, $SW_{21}$, and $SW_{22}$. In this holding section $41_n$, the switch $SW_{11}$ and the switch $SW_{12}$ are connected in series to be provided between the readout signal line $L1_n$ and a wiring Hline_s1, and one terminal of the capacitive element $C_1$ is connected to the connection point between the switch $SW_{11}$ and the switch $SW_{12}$, and the other terminal of the capacitive element $C_1$ is grounded. Further, the switch $SW_{21}$ and the switch $SW_{22}$ are connected in series to be provided between the readout signal line $L1_n$ and a wiring Hline_n1, and one terminal of the capacitive element $C_2$ is connected to the connection point between the switch $SW_{21}$ and the switch $SW_{22}$, and the other terminal of the capacitive element $C_2$ is grounded.

In this holding section $41_n$, the switch $SW_{11}$ opens and closes according to a level of a set_s1 signal supplied from the first column selecting section 42. The switch $SW_{21}$ opens and closes according to a level of a set_n1 signal supplied from the first column selecting section 42. The set_s1 signal and the set_n1 signal are input in common to the N holding sections $41_1$ to $41_N$. The switches $SW_{12}$ and $SW_{22}$ open and close according to a level of an hshift1 (n) signal supplied from the first column selecting section 42.

In this holding section $41_n$, when the set_n1 signal is shifted from a high level to a low level and the switch $SW_{21}$ opens, the noise components output from the pixel unit $P_{m,n}$ to the readout signal line $L1_n$ are thereafter held as a voltage value out_n1(n) by the capacitive element $C_2$. When the set_s1 signal is shifted from a high level to a low level and the switch $SW_{11}$ opens, the signal components superimposed with noise components output from the pixel unit $P_{m,n}$ to the readout signal line $L1_n$ are thereafter held as a voltage value out_s1(n) by the capacitive element $C_1$. Then, when the hshift1(n) signal is raised to a high level, the switch $SW_{12}$ is closed to output the voltage value out_s1(n) held by the capacitive element $C_1$ to the wiring Hline_s1, and the switch $SW_{22}$ is closed to output the voltage value out_n1(n) held by the capacitive element $C_2$ to the wiring Hline_n1. A difference between these voltage value out_s1(n) and voltage value out_n1(n) represents a voltage value corresponding to an amount of charge generated in the photodiode PD of the pixel unit $P_{m,n}$.

Figure 4:
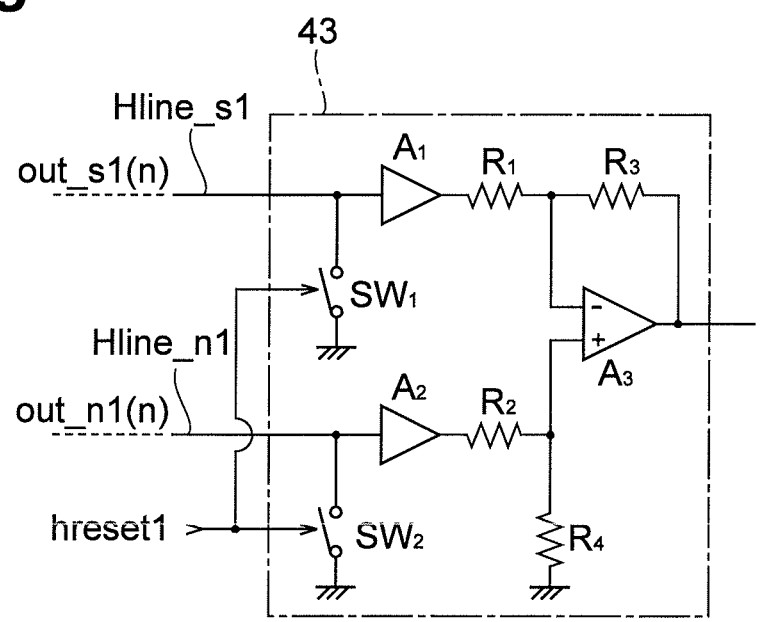
FIG. 4 is a diagram showing a circuit configuration of a difference arithmetic section 43 of the solid-state imaging device 1 according to the first embodiment.

FIG. 4 is a diagram showing a circuit configuration of the difference arithmetic section 43 of the solid-state imaging device 1 according to the first embodiment. In addition, the configuration of the difference arithmetic section 53 is the same as the configuration of the difference arithmetic section 43. As shown in this figure, the difference arithmetic section 43 includes amplifiers $A_1$ to $A_3$, switches $SW_1$ and $SW_2$, and resistors $R_1$ to $R_4$. The inverting input terminal of the amplifier $A_3$ is connected to the output terminal of the buffer amplifier $A_1$ via the resistor $R_1$, and is connected to its own output terminal via the resistor $R_3$. The non-inverting input terminal of the amplifier $A_3$ is connected to the output terminal of the buffer amplifier $A_2$ via the resistor $R_2$, and is connected to a grounding potential via the resistor $R_4$. The input terminal of the buffer amplifier $A_1$ is connected to the N holding sections $41_1$ to $41_N$ via the wiring Hline_s1, and is connected to a grounding potential via the switch $SW_1$. The input terminal of the buffer amplifier $A_2$ is connected to the N holding sections $41_1$ to $41_N$ via the wiring Hline_n1, and is connected to a grounding potential via the switch $SW_2$.

The switches $SW_1$ and $SW_2$ in the difference arithmetic section 43 are controlled by an hreset1 signal supplied from the first column selecting section 42 to carry out an opening and closing operation. When the switch $SW_1$ is closed, the voltage value input to the input terminal of the buffer amplifier $A_1$ is reset. When the switch $SW_2$ is closed, the voltage value input to the input terminal of the buffer amplifier $A_2$ is reset. When the switches $SW_1$ and $SW_2$ are open, the voltage values out_s1(n) and out_n1(n) output to the wirings Hline_s1 and Hline_n1 from any holding section $41_n$ among the N holding sections $41_1$ to $41_N$ are input to the input terminals of the buffer amplifiers $A_1$ and $A_2$. Assuming that the respective gains of the buffer amplifiers $A_1$ and $A_2$ are 1, and the respective resistance values of the four resistors $R_1$ to $R_4$ are equal to one another, a voltage value output from the output terminal of the difference arithmetic section 43 represents a difference between the voltage values respectively input via the wiring Hline_s1 and the wiring Hline_n1, that is the value from which noise components are eliminated.

Figure 5:
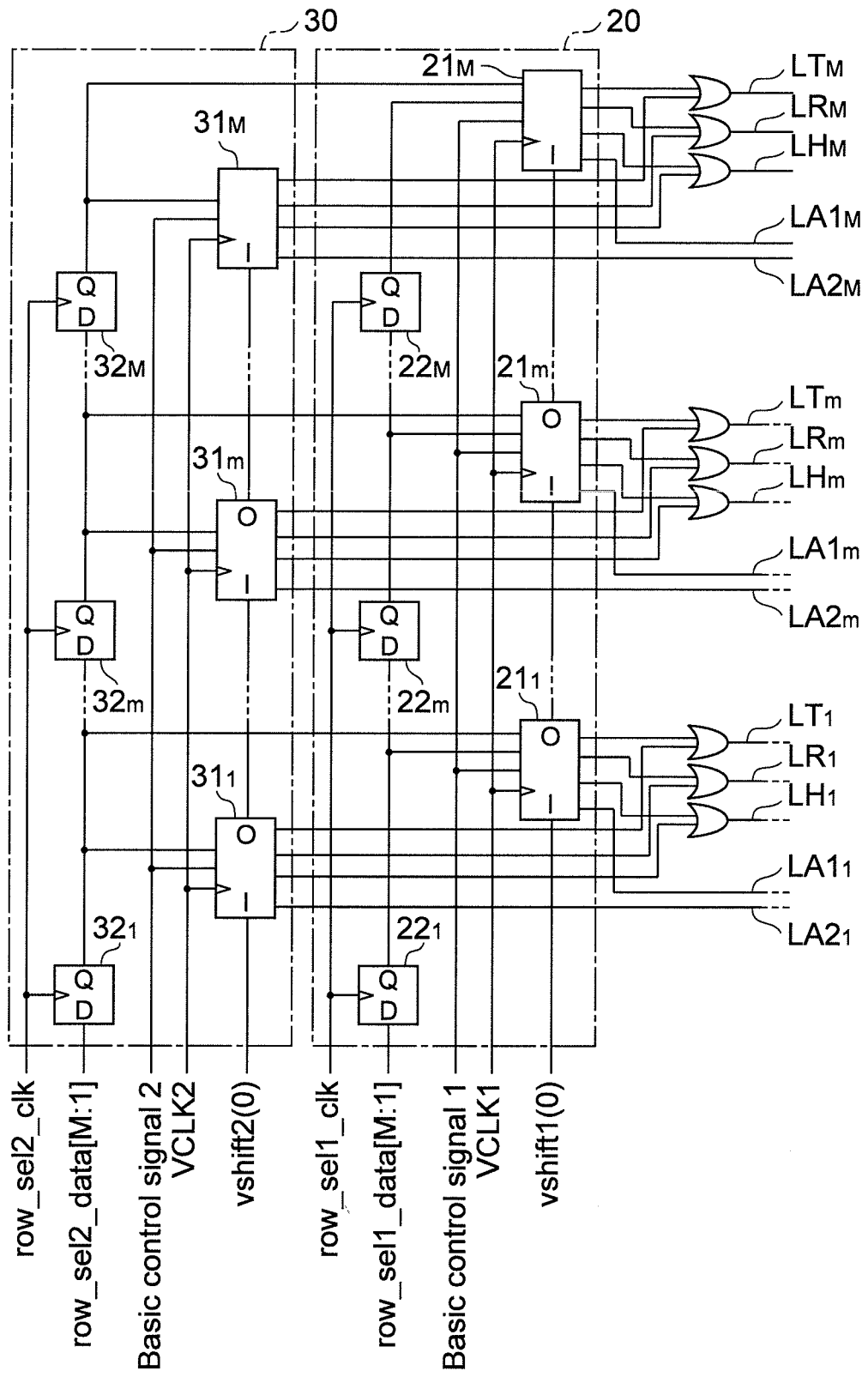
FIG. 5 is a diagram showing configurations of a first row selecting section 20 and a second row selecting section 30 of the solid-state imaging device 1 according to the first embodiment.

FIG. 5 is a diagram showing configurations of the first row selecting section 20 and the second row selecting section 30 of the solid-state imaging device 1 according to the first embodiment. As shown in this figure, the first row selecting section 20 includes M control signal generating circuits $21_1$ to $21_M$ composing a first shift register, and M latch circuits $22_1$ to $22_M$ composing a second shift register. Further, the second row selecting section 30 includes M control signal generating circuits $31_1$ to $31_M$ composing a first shift register, and M latch circuits $32_1$ to $32_M$ composing a second shift register.

The respective M control signal generating circuits $21_1$ to $21_M$ included in the first row selecting section 20 have a common configuration, and these are cascade-connected sequentially. That is, an input terminal I of each control signal generating circuit $21_m$ is connected to an output terminal O of a control signal generating circuit $21_{m-1}$ at the previous stage (here, m is an integer not less than 2 and not more than M). A vshift1(0) signal at a high level at a timing of instruction from a clock VCLK1 and at a low level thereafter is input to the input terminal I of the control signal generating circuit $21_1$ at the first stage. Each control signal generating circuit $21_m$ operates in synchronization with the clock VCLK1, and when a basic control signal 1 is input, and data row_sel1_data[m] held by a corresponding latch circuit $22_m$ is at a high level, the control signal generating circuit $21_m$ outputs the Reset1(m) signal, the Trans1(m) signal, the Hold1(m) signal, and the Address1(m) signal as being at a high level at predetermined timings.

The M latch circuits $22_1$ to $22_M$ are each a D flip-flop, and these are sequentially cascade-connected. That is, an input terminal D of each latch circuit $22_m$ is connected to an output terminal Q of a latch circuit $22_{m-1}$ at the previous stage (here, m is an integer not less than 2 and not more than M). M-bit data row_sel1_data[M:1] are serial-input to the input terminal D of the latch circuit $22_1$ at the first stage. Each latch circuit $22_m$ operates in synchronization with a clock row_sel1_clk, to be capable of holding the data row_sel1_data[m]. Each latch circuit $22_m$ provides the holding data row_sel1_data[m] to a corresponding control signal generating circuit $21_m$.

The first row selecting section 20 is provided with a vshift1(0) signal, a clock VCLK1, a basic control signal 1, M-bit data row_sel1_data[M:1], and a clock row_sel1_clk from the control section 60.

The respective M control signal generating circuits $31_1$ to $31_m$ included in the second row selecting section 30 have a common configuration, and those are cascade-connected sequentially. That is, an input terminal I of each control signal generating circuit $31_m$ is connected to an output terminal O of a control signal generating circuit $31_{m-1}$ at the previous stage (here, m is an integer not less than 2 and not more than M). A vshift2(0) signal at a high level at a timing of instruction from a clock VCLK2 and at a low level thereafter is input to the input terminal I of the control signal generating circuit $31_1$ at the first stage. Each control signal generating circuit $31_m$ operates in synchronization with the clock VCLK2, and when a basic control signal 2 is input, and data row_sel2_data[m] held by a corresponding latch circuit $32_m$ is at a high level, the control signal generating circuit $31_m$ outputs the Reset2(m) signal, the Trans2(m) signal, the Hold2(m) signal, and the Address2(m) signal as being at a high level at predetermined timings.

The M latch circuits $32_1$ to $32_M$ are each a D flip-flop, and these are sequentially cascade-connected. That is, an input terminal D of each latch circuit $32_m$ is connected to an output terminal Q of a latch circuit $32_{m-1}$ at the previous stage (here, m is an integer not less than 2 and not more than M). M-bit data row_sel2_data[M:1] are serial-input to the input terminal D of the latch circuit $32_1$ at the first stage. Each latch circuit $32_m$ operates in synchronization with a clock row_sel2_clk, to be capable of holding the data row_sel2_data[m]. Each latch circuit $32_m$ provides the holding data row_sel2_data[m] to a corresponding control signal generating circuit $31_m$, and at the same time, provides it to the control signal generating circuit $21_m$ as well.

The second row selecting section 30 is provided with a vshift2(0) signal, a clock VCLK2, a basic control signal 2, M-bit data row_sel2_data[M:1], and a clock row_sel2_clk from the control section 60.

Figure 6:
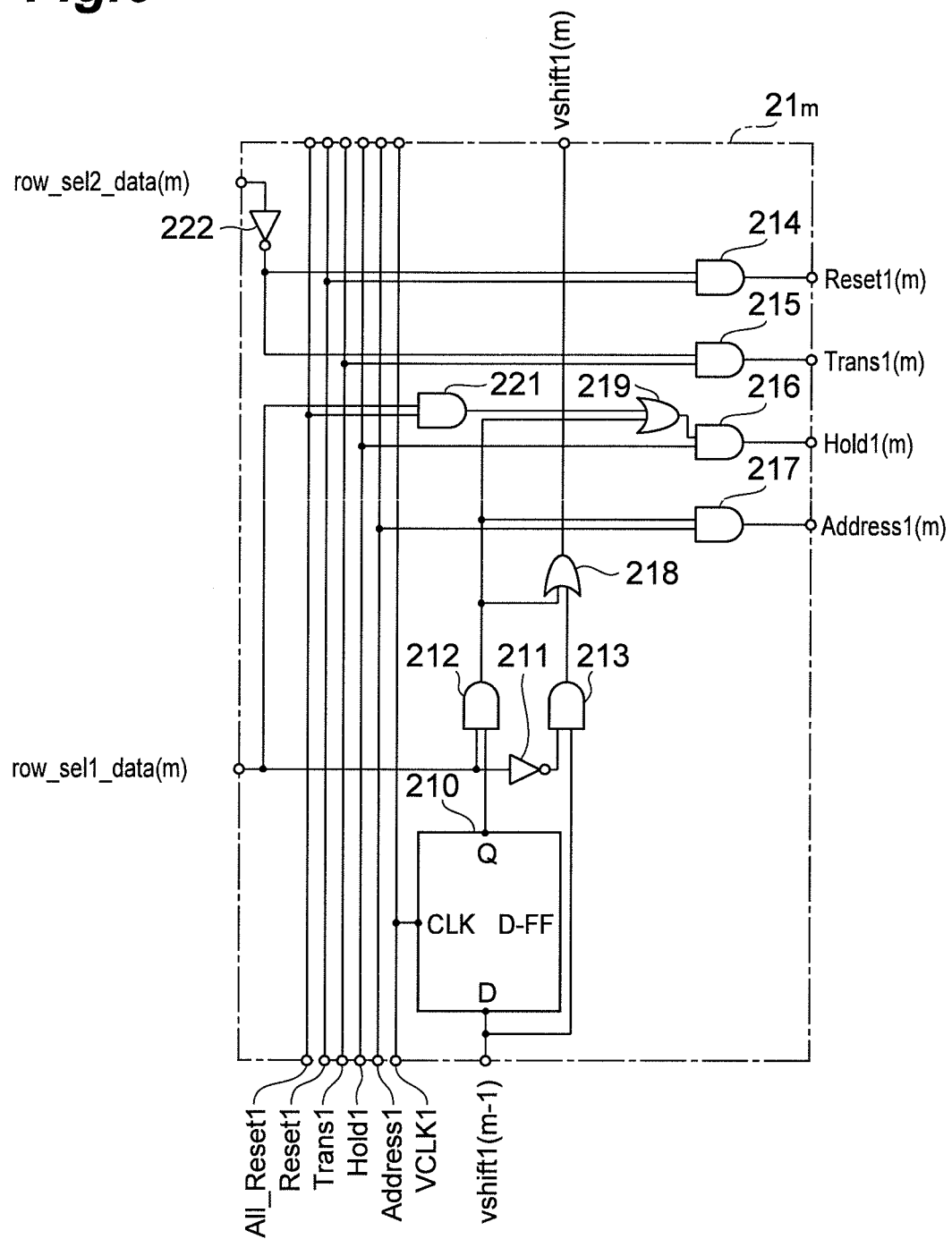
FIG. 6 is a diagram showing a configuration of a control signal generating circuit $21_m$ of the first row selecting section 20 of the solid-state imaging device 1 according to the first embodiment.

FIG. 6 is a diagram showing a configuration of a control signal generating circuit $21_m$ of the first row selecting section 20 of the solid-state imaging device 1 according to the first embodiment. Each control signal generating circuit $21_m$ includes a D flip-flop 210, a NOT circuit 211, AND circuits 212 to 217, OR circuits 218 and 219, an AND circuit 221, and a NOT circuit 222. An All_reset1 signal, a Reset1 signal, a Trans1 signal, a Hold1 signal, and an Address1 signal are input as the basic control signal 1 described in FIG. 5 to each control signal generating circuit $21_m$.

The D flip-flop 210 of each control signal generating circuit $21_m$ allows a vshift1(m−1) signal output from a control signal generating circuit $21_{m-1}$ at the previous stage to be input thereto, to hold the data at a timing of instruction from the clock VCLK1, and outputs the held data.

The AND circuit 212 of each control signal generating circuit $21_m$ allows the data row_sel1_data[m] output from a corresponding latch circuit $22_m$ to be input thereto, and allows data output from the D flip-flop 210 as well to be input thereto, and outputs data of logical conjunction of these.

The AND circuit 213 of each control signal generating circuit $21_m$ allows data that the data row_sel1_data[m] output from a corresponding latch circuit $22_m$ is logic-inverted by the NOT circuit 211 to be input thereto, and allows data of a vshift1(m−1) signal output from a control signal generating circuit $21_{m-1}$ at the previous stage as well to be input thereto, and outputs data of logical conjunction of these.

The OR circuit 218 of each control signal generating circuit $21_m$ allows respective data from the AND circuit 212 and the AND circuit 213 to be input thereto, and outputs data of logical disjunction of these as a vshift1(m) signal.

The AND circuit 214 of each control signal generating circuit $21_m$ allows data logic-inverted from the data row_sel2_data[m] output from a corresponding latch circuit $32_m$ of the second row selecting section 30 by the NOT circuit 222 to be input thereto, and allows data of the Reset1 signal as well to be input thereto, and outputs data of logical conjunction of these as a Reset1(m) signal.

The AND circuit 215 of each control signal generating circuit $21_m$ allows data logic-inverted from the data row_sel2_data[m] output from a corresponding latch circuit $32_m$ of the second row selecting section 30 by the NOT circuit 222 to be input thereto, and allows data of the Trans1 signal as well to be input thereto, and outputs data of logical conjunction of these as a Trans1(m) signal.

The AND circuit 221 of each control signal generating circuit $21_m$ allows data row_sel1_data[m] output from a corresponding latch circuit $22_m$, and allows data of the All_reset1 signal as well to be input thereto, and outputs data of logical conjunction of these.

The OR circuit 219 of each control signal generating circuit $21_m$ allows output data from the AND circuit 221 to be input thereto, and allows output data from the AND circuit 212 as well to be input thereto, and outputs data of logical disjunction of these.

The AND circuit 216 of each control signal generating circuit $21_m$ allows output data from the OR circuit 219 to be input thereto, and allows data of the Hold1 signal as well to be input thereto, and outputs data of logical conjunction of these as a Hold1(m) signal.

The AND circuit 217 of each control signal generating circuit $21_m$ allows data of the Address1 signal to be input thereto, and allows output data from the AND circuit 212 as well to be input thereto, and outputs data of logical conjunction of these as an Address1(m) signal.

Figure 7:
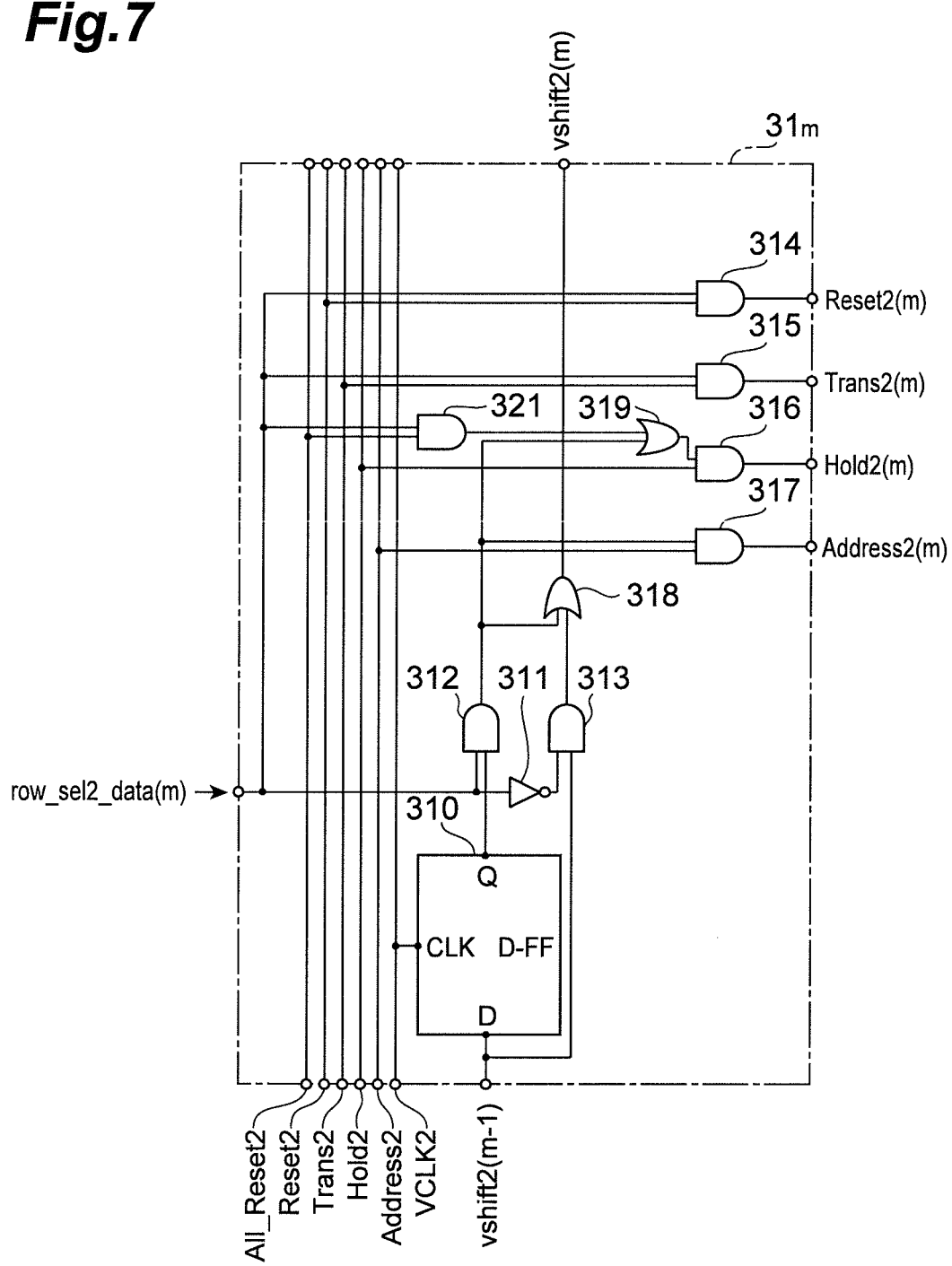
FIG. 7 is a diagram showing a configuration of a control signal generating circuit $31_m$ of the second row selecting section 30 of the solid-state imaging device 1 according to the first embodiment.

FIG. 7 is a diagram showing a configuration of the control signal generating circuit $31_m$ of the second row selecting section 30 of the solid-state imaging device 1 according to the first embodiment. Each control signal generating circuit $31_m$ includes a D flip-flop 310, a NOT circuit 311, AND circuits 312 to 317, OR circuits 318 and 319, and an AND circuit 321. An All_reset2 signal, a Reset2 signal, a Trans2 signal, a Hold2 signal, and an Address2 signal are input as the basic control signal 2 described in FIG. 5 to each control signal generating circuit $31_m$.

The D flip-flop 310 of each control signal generating circuit $31_m$ allows a vshift2(m−1) signal output from a control signal generating circuit $31_{m-1}$ at the previous stage to be input thereto, to hold the data at a timing of instruction from the clock VCLK2, and outputs the held data.

The AND circuit 312 of each control signal generating circuit $31_m$ allows data row_sel2_data[m] output from a corresponding latch circuit $32_m$ to be input thereto, and allows data output from the D flip-flop 310 as well to be input thereto, and outputs data of logical conjunction of these.

The AND circuit 313 of each control signal generating circuit $31_m$ allows data logic-inverted from data row_sel2_data[m] output from a corresponding latch circuit $32_m$ by the NOT circuit 311 to be input thereto, and allows data of a vshift2(m−1) signal output from a control signal generating circuit $31_{m-1}$ at the previous stage as well to be input thereto, and outputs data of logical conjunction of these.

The OR circuit 318 of each control signal generating circuit $31_m$ allows respective data from the AND circuit 312 and the AND circuit 313 to be input thereto, and outputs data of logical disjunction of these as a vshift2(m) signal.

The AND circuit 314 of each control signal generating circuit $31_m$ allows data row_sel2_data[m] output from a corresponding latch circuit $32_m$ to be input thereto, and allows data of the Reset2 signal as well to be input thereto, and outputs data of logical conjunction of these as a Reset2(m) signal.

The AND circuit 315 of each control signal generating circuit $31_m$ allows data row_sel2_data[m] output from a corresponding latch circuit $32_m$ to be input thereto, and allows data of the Trans2 signal as well to be input thereto, and outputs data of logical conjunction of these as a Trans2(m) signal.

The AND circuit 321 of each control signal generating circuit $31_m$ allows data row_sel2_data[m] output from a corresponding latch circuit $32_m$ to be input thereto, and allows data of the All_reset2 signal as well to be input thereto, and outputs data of logical conjunction of these.

The OR circuit 319 of each control signal generating circuit $31_m$ allows output data from the AND circuit 321 to be input thereto, and allows output data from the AND circuit 312 as well to be input thereto, and outputs data of logical disjunction of these.

The AND circuit 316 of each control signal generating circuit $31_m$ allows output data from the OR circuit 319 to be input thereto, and allows data of the Hold2 signal as well to be input thereto, and outputs data of logical conjunction of these as a Hold2(m) signal.

The AND circuit 317 of each control signal generating circuit $31_m$ allows data of the Address2 signal to be input thereto, and allows output data from the AND circuit 312 as well to be input thereto, and outputs data of logical conjunction of these as an Address2(m) signal.

The data row_sel1_data[m1] is set to a high level so as to correspond to the m1-th row to be selected by the first row selecting section 20. Further, the data row_sel2_data[m2] is set to a high level so as to correspond to the m2-th row to be selected by the second row selecting section 30. In order to make the m1-th row selected by the first row selecting section 20 and the m2-th row selected by the second row selecting section 30 be different from each other, it is necessary for the data row_sel1_data[m] and the data row_sel2_data[m] both to be not at a high level, and for at least one of these to be at a low level with respect to each m value.

In the first row selecting section 20 with the configuration shown in FIG. 6, in the case where the data row_sel1_data[m1] held in an m1-th latch circuit $22_{m1}$ among the M latch circuits $22_1$ to $22_M$ is at a high level (at this time, the data row_sel2_data[m1] is necessarily at a low level), a control signal generating circuit $21_{m1}$ corresponding thereto is capable of outputting control signals (a Reset1(m1) signal, a Trans1(m1) signal, a Hold1(m1) signal) to each pixel unit $P_{m1,n}$ of the m1-th row as being at a high level at predetermined timings, and outputting an Address1(m) signal as well as being at a high level at a predetermined timing.

Further, in the first row selecting section 20, a control signal generating circuit corresponding to a latch circuit whose holding data row_sel1_data[m] is at a low level among the M latch circuits $22_1$ to $22_M$ is capable of outputting the vshift1 signal reaching from the previous stage immediately to the subsequent stage. That is, only latch circuits whose holding data row_sel1_data[m] are at a high level among the M latch circuits $22_1$ to $22_M$ compose a substantive shift register. Therefore, the first row selecting section 20 is capable of sequentially outputting control signals at a constant time interval (a period of the clock VCLK1) to rows corresponding to latch circuits whose holding data row_sel1_data[m] are at a high level among the M latch circuits $22_1$ to $22_M$.

In the second row selecting section 30 with the configuration shown in FIG. 7, in the case where the data row_sel2_data[m2] held in an m2-th latch circuit $32_{m2}$ among the M latch circuits $32_1$ to $32_M$ is at a high level (at this time, the data row_sel1_data[m2] is necessarily at a low level), a control signal generating circuit $31_{m2}$ corresponding thereto is capable of outputting control signals (a Reset2(m2) signal, a Trans2(m2) signal, a Hold2(m2) signal) to each pixel unit $P_{m2,n}$ of the m2-th row as being at a high level at predetermined timings, and outputting an Address2(m2) signal as well as being at a high level at a predetermined timing.

Further, in the second row selecting section 30, a control signal generating circuit corresponding to a latch circuit whose holding data row_sel2_data[m] is at a low level among the M latch circuits $32_1$ to $32_M$ is capable of outputting the vshift2 signal reaching from the previous stage immediately to the subsequent stage. That is, only latch circuits whose holding data row_sel2_data[m] are at a high level among the M latch circuits $32_1$ to $32_M$ compose a substantive shift register. Therefore, the second row selecting section 30 is capable of sequentially outputting control signals at a constant time interval (a period of the clock VCLK2) to rows corresponding to latch circuits whose holding data row_sel2_data[m] are at a high level among the M latch circuits $32_1$ to $32_M$.

Moreover, in the case where the data row_sel1_data[m3] held in an m3-th latch circuit $22_{m3}$ among the M latch circuits $22_1$ to $22_M$ in the first row selecting section 20 are at a low level, and the data row_sel2_data[m3] held in an m3-th latch circuit $32_{m3}$ among the M latch circuits $32_1$ to $32_M$ in the second row selecting section 30 as well are at a low level, a corresponding control signal generating circuit $21_{m3}$ of the first row selecting section 20 is capable of outputting control signals (a Reset1(m3) signal, a Trans1(m3) signal) to each pixel unit $P_{m3,n}$ of the m3-th row as being at a high level at predetermined timings, but does not output a Hold1(m3) signal and an Address1(m3) signal as being at a high level at predetermined timings in any case.

That is, the first row selecting section 20 selects all the rows which are neither the m1-th row selected by the first row selecting section 20 nor the m2-th row selected by the second row selecting section 30 among the first to M-th rows in the light receiving section 10, as the m3-th rows, and outputs a control signal to each pixel unit $P_{m3,n}$ of the m3-th rows, thereby it is possible to discharge the junction capacitance section of the photodiode PD, and to accumulate the charge generated in the photodiode in the charge accumulating section.

Figure 8:
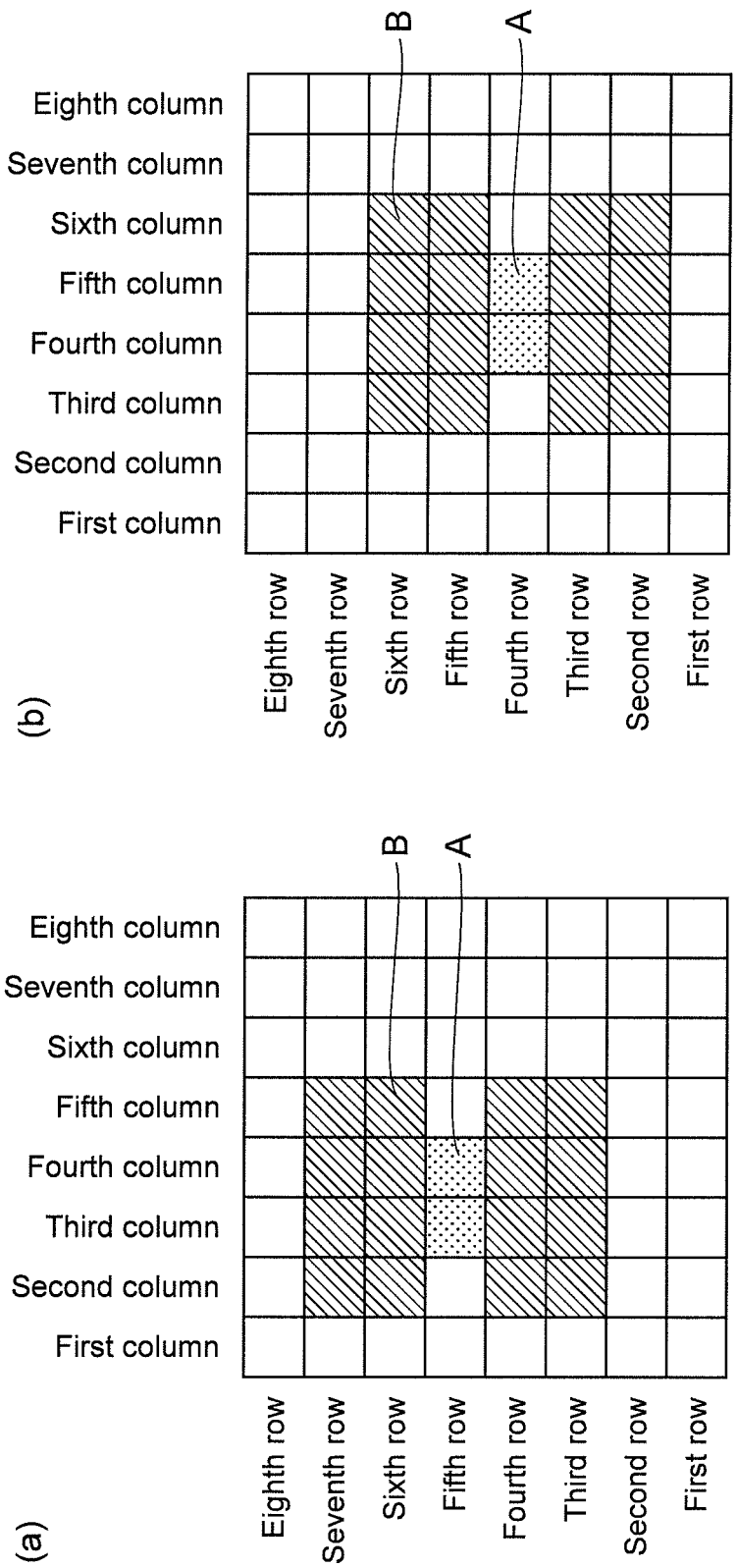
FIG. 8 are diagrams for describing pixel units in a light receiving section 10 from which data are read out by the first readout section 40 and the second readout section 50 respectively in a case of the operation of a comparison example.
Figure 9:
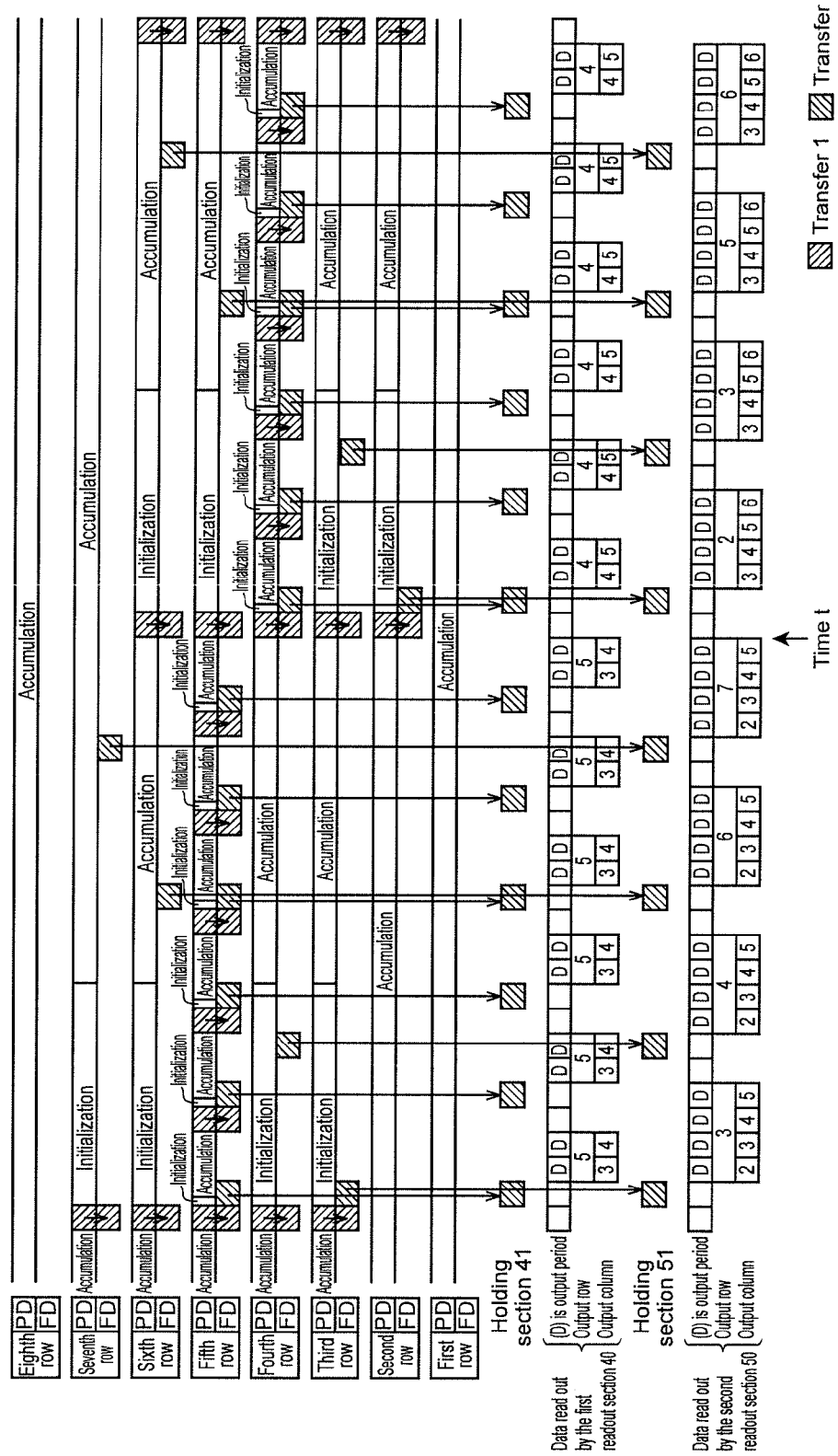
FIG. 9 is a timing chart in a case of the operation of the comparison example.

Next, an embodiment (FIGS. 10 and 11) of the operation of the solid-state imaging device 1 according to the first embodiment will be described in comparison with a comparison example (FIGS. 8 and 9). In the comparison example, both of the first row selecting section and the second row selecting section do not discharge the junction capacitance section of the photodiode with respect to each pixel unit $P_{m3,n}$ of any m3-th row different from the m1-th row and the m2-th row in the light receiving section 10. In both of the embodiment and the comparison example, it is assumed that M=N=8 for convenience of description.

FIG. 8 are diagrams for describing pixel units in the light receiving section 10 from which data are read out by the first readout section 40 and the second readout section 50 respectively in a case of the operation of the comparison example. In the comparison example, before a given time t, as shown in FIG. 8(a), respective communication data of the pixel unit $P_{5,3}$ and the pixel unit $P_{5,4}$ in the light receiving section 10 are read out by the first row selecting section and the first readout section (the region A in FIG. 8(a)), and respective image data of the pixel unit $P_{3,2}$ to the pixel unit $P_{3,5}$, the pixel unit $P_{4,2}$ to the pixel unit $P_{4,5}$, the pixel unit $P_{6,2}$ to the pixel unit $P_{6,5}$, and the pixel unit $P_{7,2}$ to the pixel unit $P_{7,5}$ in the light receiving section 10 are read out by the second row selecting section and the second readout section (the region B in FIG. 8(a)).

Then, in the comparison example, after the time t, as shown in FIG. 8(b), respective communication data of the pixel unit $P_{4,4}$ and the pixel unit $P_{4,5}$ in the light receiving section 10 are read out by the first row selecting section and the first readout section (the region A in FIG. 8(b)), and respective image data of the pixel unit $P_{2,3}$ to the pixel unit $P_{2,6}$, the pixel unit $P_{3,3}$ to the pixel unit $P_{3,6}$, the pixel unit $P_{5,3}$ to the pixel unit $P_{5,6}$, and the pixel unit $P_{6,3}$ to the pixel unit $P_{6,6}$ in the light receiving section 10 are read out by the second row selecting section and the second readout section (the region B in FIG. 8(b)).

That is, in the comparison example, the regions A and B in the pixel units in the light receiving section 10 read out by the first readout section or the second readout section are shifted by an amount of one pixel respectively in the row direction and the column direction with the given time t serving as a boundary.

FIG. 9 is a timing chart in a case of the operation of the comparison example. This figure shows, in order from the top, the operations of the respective pixel units of the eighth row to the first row in the light receiving section 10, the data input operation of the holding section 41 of the first readout section 40, the data output operation from the first readout section 40, the data input operation of the holding section 51 of the second readout section 50, and the data output operation from the second readout section 50.

In the figure, the "Transfer 1" means that the charge in the junction capacitance section of the photodiode PD is transferred to an FD region (a diffusion region (the charge accumulating section) connected to the gate terminal of the transistor T3) by bringing the transistor T2 and the transistor T5 into an ON state in a pixel unit. The "Transfer 2" means that data corresponding to an accumulated charge amount in the charge accumulating section is transferred to the holding section 41 or the holding section 51 by bringing the transistor $T4_1$ or the transistor $T4_2$ into an ON state in a pixel unit. The "Initialization" means that the charge in the junction capacitance section of the photodiode PD is discharged to be initialized by bringing the transistor T1 and the transistor T2 into an ON state in a pixel unit. The "Accumulation" means that charge generated in the photodiode PD is accumulated in the junction capacitance section by bringing the transistor T1 into an OFF state in a pixel unit.

As shown in this figure, in the comparison example, because the respective communication data of the pixel unit $P_{4,4}$ and the pixel unit $P_{4,5}$ initially read out by the first readout section 40 immediately after the time t correspond to an amount of the charge finally accumulated over a long period immediately before the time t, the communication data may be wrong values in some cases. Therefore, it is impossible to accurately receive an optical signal from the optical signal source.

On the other hand, in this comparison example, because the respective image data of the pixel units $P_{2,3}$ to $P_{2,6}$ of the second row initially read out by the second readout section 50 immediately after the time t correspond to an amount of the charge finally accumulated over a period longer than usual immediately before the time t, the image data may be wrong values in some cases. Further, because the respective image data of the pixel units $P_{5,3}$ to $P_{5,6}$ of the fifth row initially read out by the second readout section 50 immediately after the time t correspond to an amount of the charge finally accumulated over a period shorter than usual immediately before the time t, the image data may be wrong values in some cases. However, because these data are not communication data but image data, there may be no problem even if the data are wrong, or the wrong data may be interpolated by use of data of the adjacent rows, which does not become a major problem.

Figure 10:
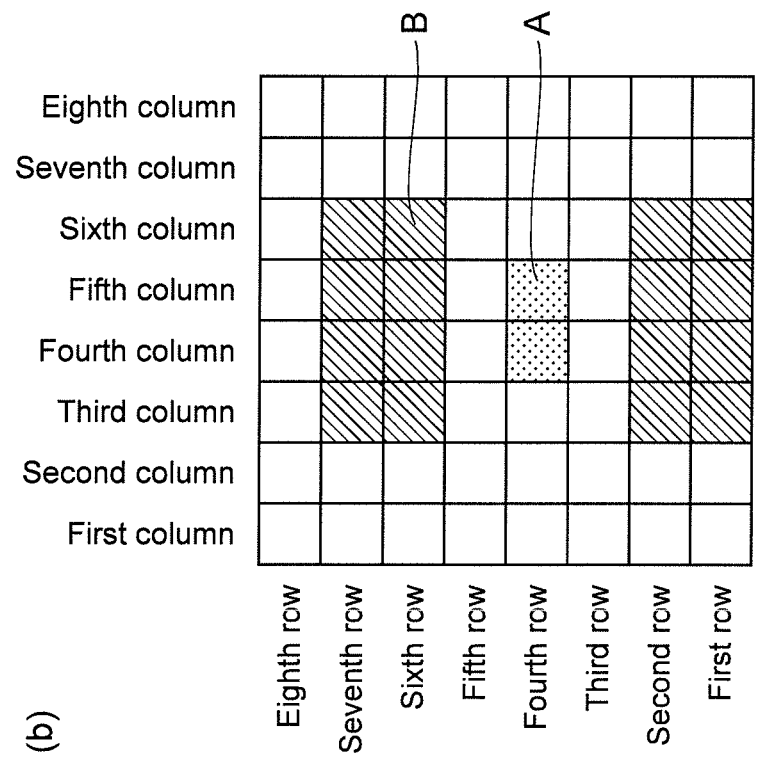
FIG. 10 are diagrams for describing pixel units in the light receiving section 10 from which data are read out by the first readout section 40 and the second readout section 50 respectively in a case of the operation of an embodiment.
Figure 10:
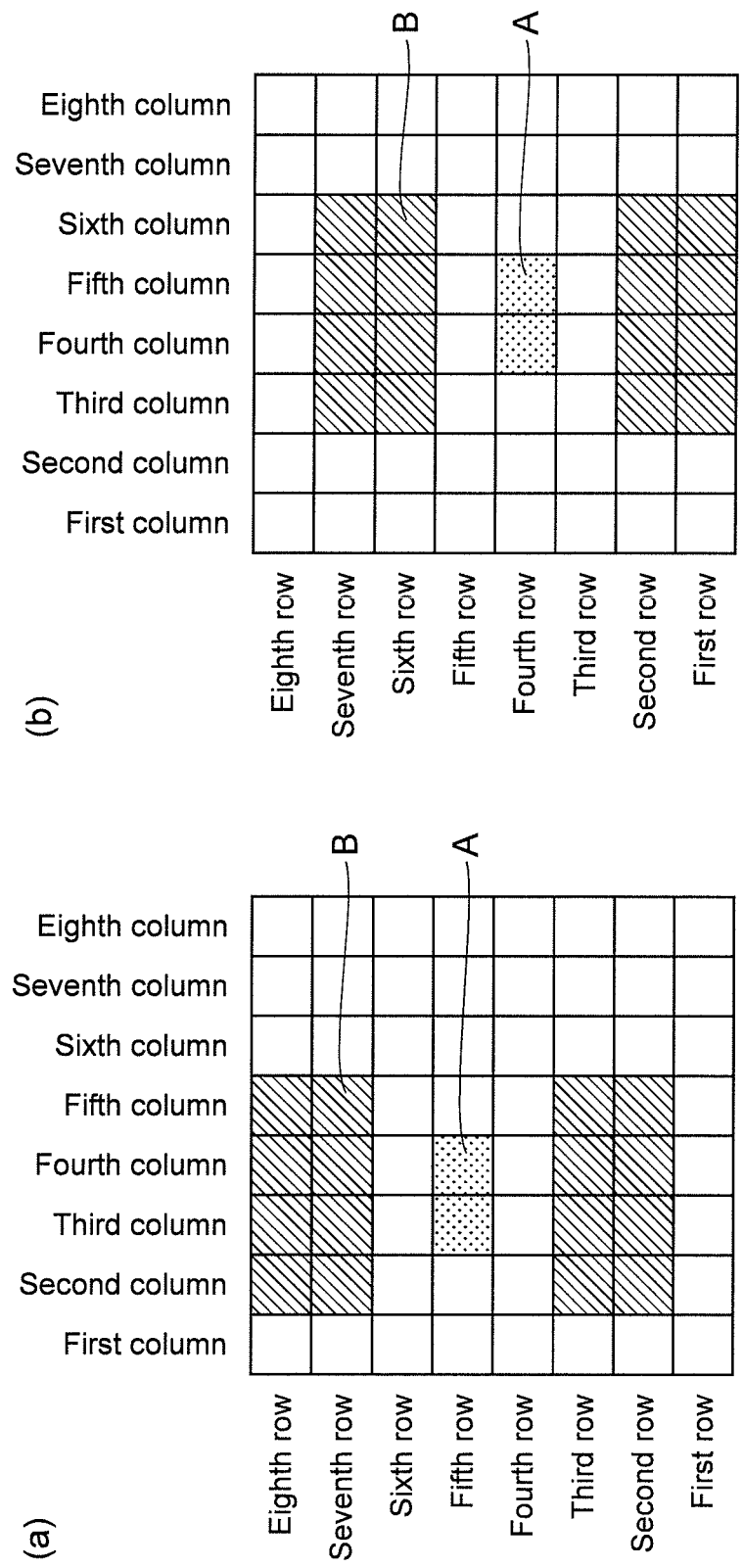

FIG. 10 are diagrams for describing pixel units in the light receiving section 10 from which data are read out by the first readout section 40 and the second readout section 50 respectively in a case of the operation of the embodiment. In the embodiment, before a given time t, as shown in FIG. 10(a), respective communication data of the pixel unit $P_{5,3}$ and the pixel unit $P_{5,4}$ in the light receiving section 10 are read out by the first row selecting section and the first readout section (the region A in FIG. 10(a)), and respective image data of the pixel unit $P_{2,2}$ to the pixel unit $P_{2,5}$, the pixel unit $P_{3,2}$ to the pixel unit $P_{3,5}$, the pixel unit $P_{7,2}$ to the pixel unit $P_{7,5}$, and the pixel unit $P_{8,2}$ to the pixel unit $P_{8,5}$ in the light receiving section 10 are read out by the second row selecting section and the second readout section (the region B in FIG. 10(a)). Further, by the first row selecting section 20, the junction capacitance section of the photodiode PD in each pixel unit of each of the first row, the fourth row, and the sixth row is initialized at the same timing as the junction capacitance section of the photodiode PD in each pixel unit of the fifth row.

Then, in the embodiment, after the time t, as shown in FIG. 10(b), respective communication data of the pixel unit $P_{4,4}$ and the pixel unit $P_{4,5}$ in the light receiving section 10 are read out by the first row selecting section and the first readout section (the region A in FIG. 10(b)), and respective image data of the pixel unit $P_{1,3}$ to the pixel unit $P_{1,6}$, the pixel unit $P_{2,3}$ to the pixel unit $P_{2,6}$, the pixel unit $P_{6,3}$ to the pixel unit $P_{6,6}$, and the pixel unit $P_{7,3}$ to the pixel unit $P_{7,6}$ in the light receiving section 10 are read out by the second row selecting section and the second readout section (the region B in FIG. 10(b)). Further, by the first row selecting section 20, the junction capacitance section of the photodiode PD in each pixel unit of each of the third row, the fifth row, and the eighth row is initialized at the same timing as the junction capacitance section of the photodiode PD in each pixel unit of the fourth row.

That is, in the embodiment, the regions A and B in the pixel units in the light receiving section 10 read out by the first readout section or the second readout section are shifted by an amount of one pixel respectively in the row direction and the column direction with the given time t serving as a boundary, and further, rows onto which only initialization of the junction capacitance section of the photodiode PD is carried out by the first row selecting section 20 are shifted down by an amount of one row.

Figure 11:
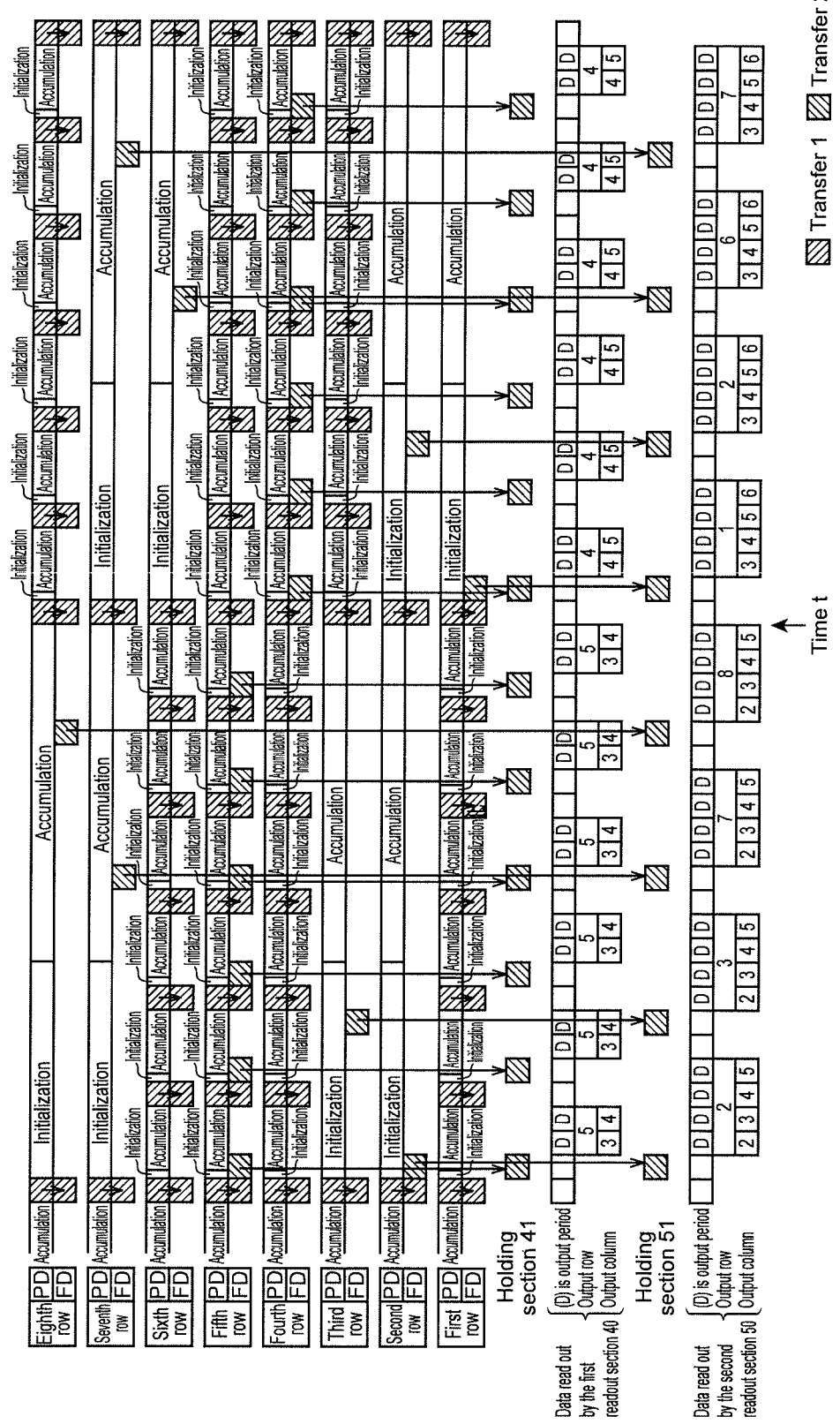
FIG. 11 is a timing chart in a case of the operation of the embodiment.

FIG. 11 is a timing chart in a case of the operation of the embodiment. This figure shows, in order from the top, the operations of the respective pixel units of the eighth row to the first row in the light receiving section 10, the data input operation of the holding section 41 of the first readout section 40, the data output operation from the first readout section 40, the data input operation of the holding section 51 of the second readout section 50, and the data output operation from the second readout section 50. The respective "Transfer 1," "Transfer 2," "Initialization," and "Accumulation" in this figure are the same as those in FIG. 9.

As shown in this figure, in the embodiment, the respective communication data of the pixel unit $P_{4,4}$ and the pixel unit $P_{4,5}$ initially read out by the first readout section 40 immediately after the time t correspond to an amount of the charge accumulated over the same period after the time t, before the time t. Therefore, it is possible to accurately receive an optical signal from the optical signal source. In this way, the solid-state imaging device 1 according to the first embodiment is capable of accurately receiving an optical signal from the optical signal source even in a case where the position of the optical signal source is tracked.

On the other hand, in this embodiment, because the image data of each pixel unit of the first row and the sixth row initially read out by the second readout section 50 immediately after the time t correspond to an amount of the charge finally accumulated over a period shorter than usual immediately before the time t, the image data may be wrong values in some cases. However, because these data are not communication data but image data, there may be no problem even if the data are wrong, or the wrong data may be interpolated by use of data of the adjacent rows, which does not become a major problem.

In addition, the solid-state imaging device 1 according to the first embodiment is capable of operating in various modes. For example, the first row selecting section 20 may select the odd-numbered rows in the light receiving section 10, and the second row selecting section 30 may select the even-numbered rows in the light receiving section 10. In this case, the position of the optical signal source is specified on the basis of image data of the even-numbered rows read out by the second row selecting section 30 and the second readout section 50, and data from the pixel units of any odd-numbered row at the specified position in the image are read out as communication data by the first row selecting section 20 and the first readout section 40. In this case, the first row selecting section 20 initializes the junction capacitance section of the photodiode PD of each pixel unit of odd-numbered rows other than the row from which the communication data are read out by the first readout section 40.

(Second Embodiment)

Next, a second embodiment will be described. In the solid-state imaging device 1 according to the first embodiment, only the first row selecting section 20 is capable of discharging the junction capacitance section of the photodiode PD of each pixel unit $P_{m3,n}$ of the m3-th row. On the other hand, in a solid-state imaging device 2 according to a second embodiment, by switching between a first row selecting section 20A and a second row selecting section 30A, it is possible to determine any one of the first row selecting section 20A and the second row selecting section 30A as a row selecting section that outputs a control signal to each pixel unit $P_{m3,n}$ of the m3-th row in the light receiving section 10, thereby discharging the junction capacitance section of the photodiode PD.

Figure 12:
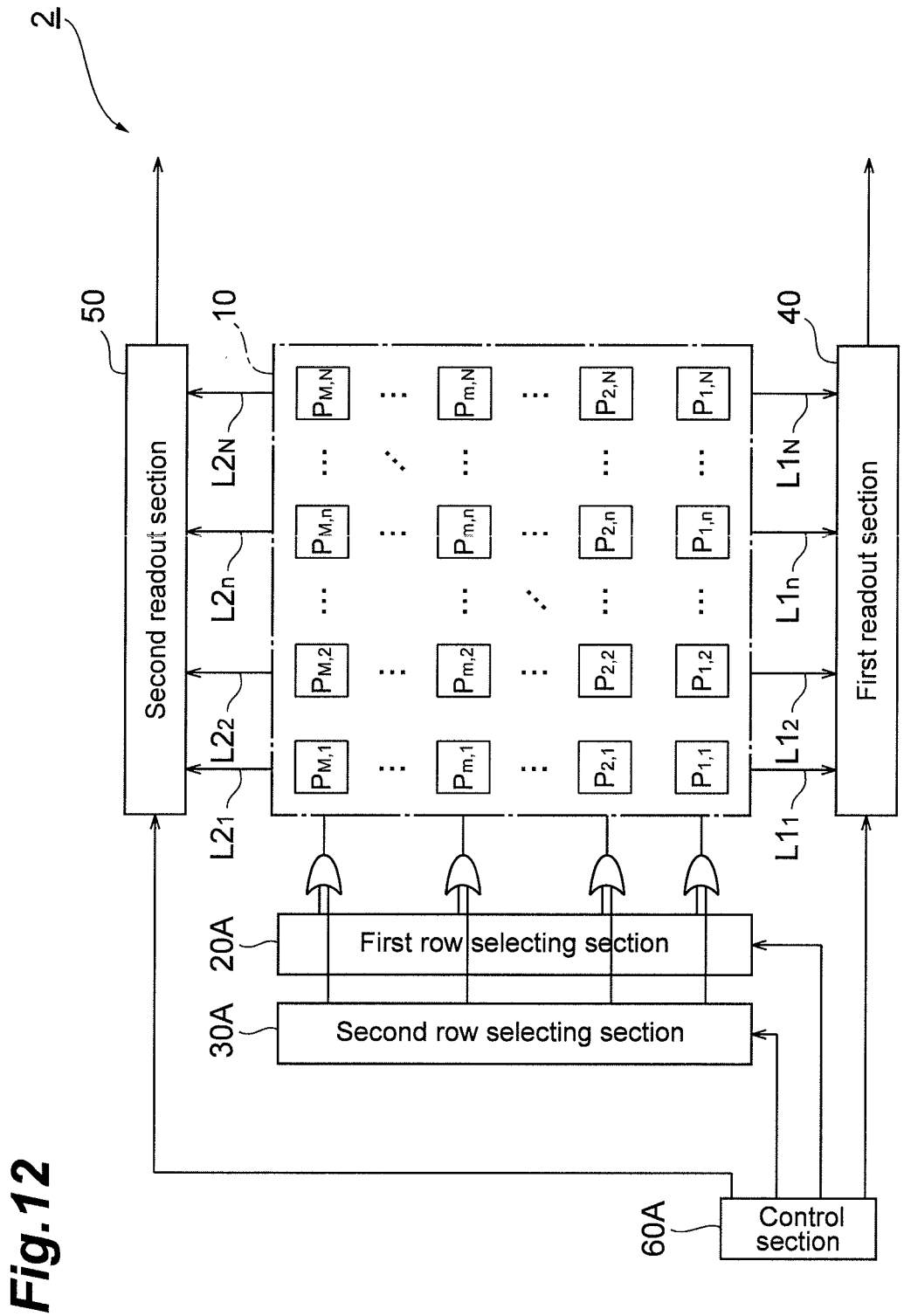
FIG. 12 is a diagram showing a schematic configuration of a solid-state imaging device 2 according to a second embodiment.

FIG. 12 is a diagram showing a schematic configuration of the solid-state imaging device 2 according to the second embodiment. As compared with the schematic configuration of the solid-state imaging device 1 according to the first embodiment shown in FIG. 1, the solid-state imaging device 2 according to the second embodiment shown in FIG. 12 is different in the point that the first row selecting section 20A is included in place of the first row selecting section 20, and is different in the point that the second row selecting section 30A is included in place of the second row selecting section 30, and is different in the point that a control section 60A is included in place of the control section 60. The light receiving section 10, the first readout section 40, and the second readout section 50 are respectively the same as those in the first embodiment.

The control section 60A controls respective operations of the first row selecting section 20A, the second row selecting section 30A, the first readout section 40, and the second readout section 50, to control the entire operation of the solid-state imaging device 2. The first row selecting section 20A and the first readout section 40, the second row selecting section 30A and the second readout section 50 are capable of operating in parallel with each other under the control of the control section 60A.

Figure 13:
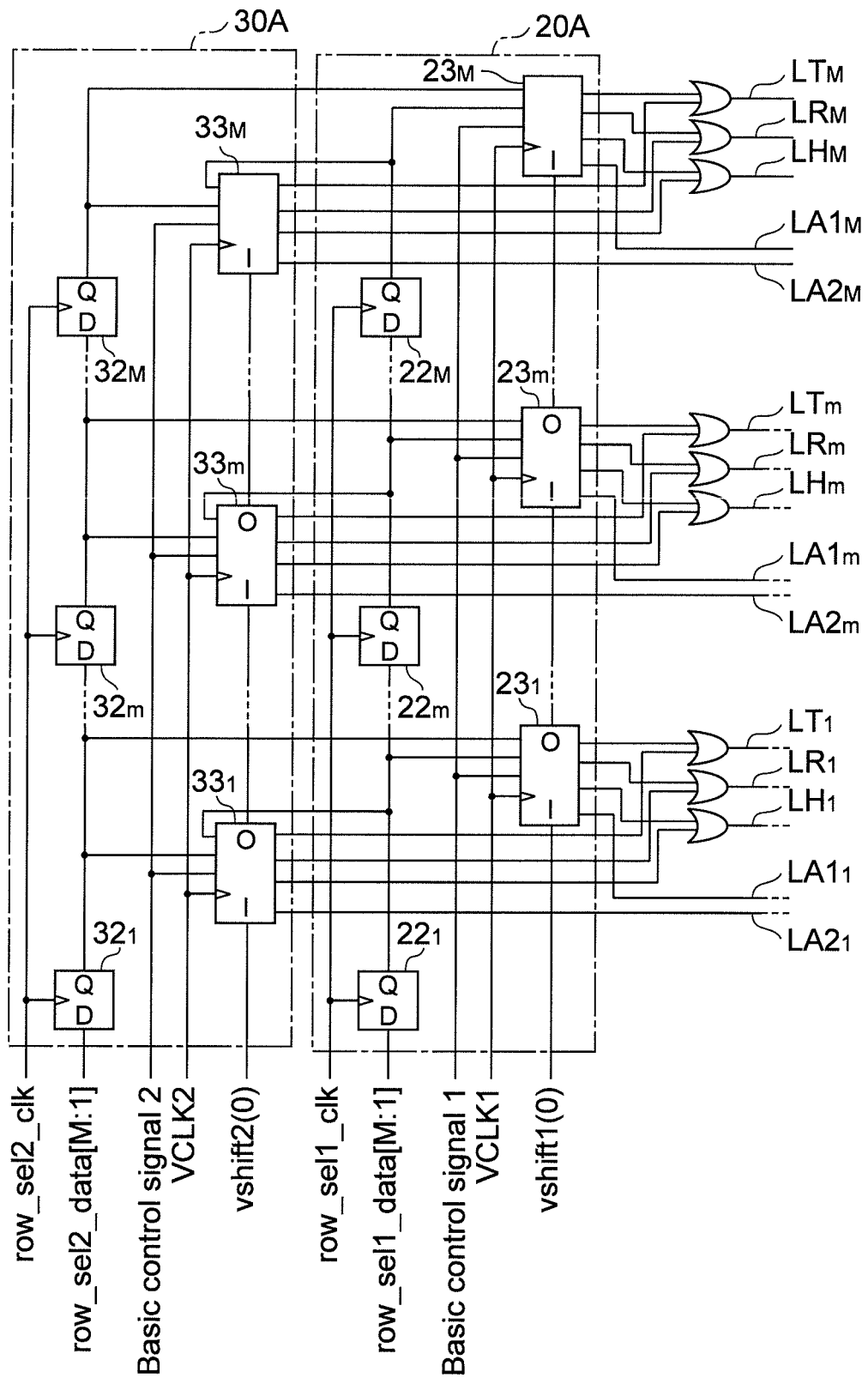
FIG. 13 is a diagram showing configurations of a first row selecting section 20A and a second row selecting section 30A of the solid-state imaging device 2 according to the second embodiment.

FIG. 13 is a diagram showing configurations of the first row selecting section 20A and the second row selecting section 30A of the solid-state imaging device 2 according to the second embodiment. As shown in this figure, the first row selecting section 20A includes M control signal generating circuits $23_1$ to $23_M$ composing a first shift register, and M latch circuits $22_1$ to $22_M$ composing a second shift register. Further, the second row selecting section 30A includes M control signal generating circuits $33_1$ to $33_M$ composing a first shift register, and M latch circuits $32_1$ to $32_M$ composing a second shift register.

The respective M control signal generating circuits $23_1$ to $23_M$ included in the first row selecting section 20A have a common configuration, and these are cascade-connected sequentially. That is, an input terminal I of each control signal generating circuit $23_m$ is connected to an output terminal O of a control signal generating circuit $23_{m-1}$ at the previous stage (here, m is an integer not less than 2 and not more than M). A vshift1(0) signal at a high level at a timing of instruction from a clock VCLK1 and at a low level thereafter is input to the input terminal I of the control signal generating circuit $23_1$ at the first stage. Each control signal generating circuit $23_m$ operates in synchronization with the clock VCLK1, and when a basic control signal 1 is input, and data row_sel1_data held by a corresponding latch circuit $22_m$ is at a high level, the control signal generating circuit $23_m$ outputs the Reset1(m) signal, the Trans1 (m) signal, the Hold1(m) signal, and the Address1(m) signal as being at a high level at predetermined timings.

The M latch circuits $22_1$ to $22_M$ are each a D flip-flop, and these are sequentially cascade-connected. That is, an input terminal D of each latch circuit $22_m$ is connected to an output terminal Q of a latch circuit $22_{m-1}$ at the previous stage (here, m is an integer not less than 2 and not more than M). M-bit data row_sel1_data[M:1] are serial-input to the input terminal D of the latch circuit $22_1$ at the first stage. Each latch circuit $22_m$ operates in synchronization with a clock row_sel1_clk, to be capable of holding the data row_sel1_data[m]. Each latch circuit $22_m$ provides the holding data row_sel1_data[m] to a corresponding control signal generating circuit $23_m$, and at the same time, provides it to a control signal generating circuit $33_m$ as well.

The first row selecting section 20A is provided with a vshift1(0) signal, a clock VCLK1, a basic control signal 1, M-bit data row_sel1_data[M:1], and a clock row _sel1$_{13}$ clk from the control section 60A.

The respective M control signal generating circuits $33_1$ to $33_m$ included in the second row selecting section 30A have a common configuration, and these are cascade-connected sequentially. That is, an input terminal I of each control signal generating circuit $33_m$ is connected to an output terminal O of a control signal generating circuit $33_{m-1}$ at the previous stage (here, m is an integer not less than 2 and not more than M). A vshift2(0) signal at a high level at a timing of instruction from a clock VCLK2 and at a low level thereafter is input to the input terminal I of the control signal generating circuit $33_1$ at the first stage. Each control signal generating circuit $33_m$ operates in synchronization with the clock VCLK2, and when a basic control signal 2 is input, and data row_sel2_data[m] held by a corresponding latch circuit $32_m$ is at a high level, the control signal generating circuit $33_m$ outputs the Reset2(m) signal, the Trans2(m) signal, the Hold2(m) signal, and the Address2(m) signal as being at a high level at predetermined timings.

The M latch circuits $32_1$ to $32_M$ are each a D flip-flop, and these are sequentially cascade-connected. That is, an input terminal D of each latch circuit $32_m$ is connected to an output terminal Q of a latch circuit $32_{m4}$ at the previous stage (here, m is an integer not less than 2 and not more than M). M-bit data row_sel2_data[M:1] are serial-input to the input terminal D of the latch circuit $32_1$ at the first stage. Each latch circuit $32_m$ operates in synchronization with a clock row_sel2_clk, to be capable of holding the data row_sel2_data[m]. Each latch circuit $32_m$ provides the holding data row_sel2_data[m] to a corresponding control signal generating circuit $33_m$, and at the same time, provides it to the control signal generating circuit $23_m$ as well.

The second row selecting section 30A is provided with a vshift2(0) signal, a clock VCLK2, a basic control signal 2, M-bit data row_sel2_data[M:1], and a clock row_sel2_clk from the control section 60A.

Figure 14:
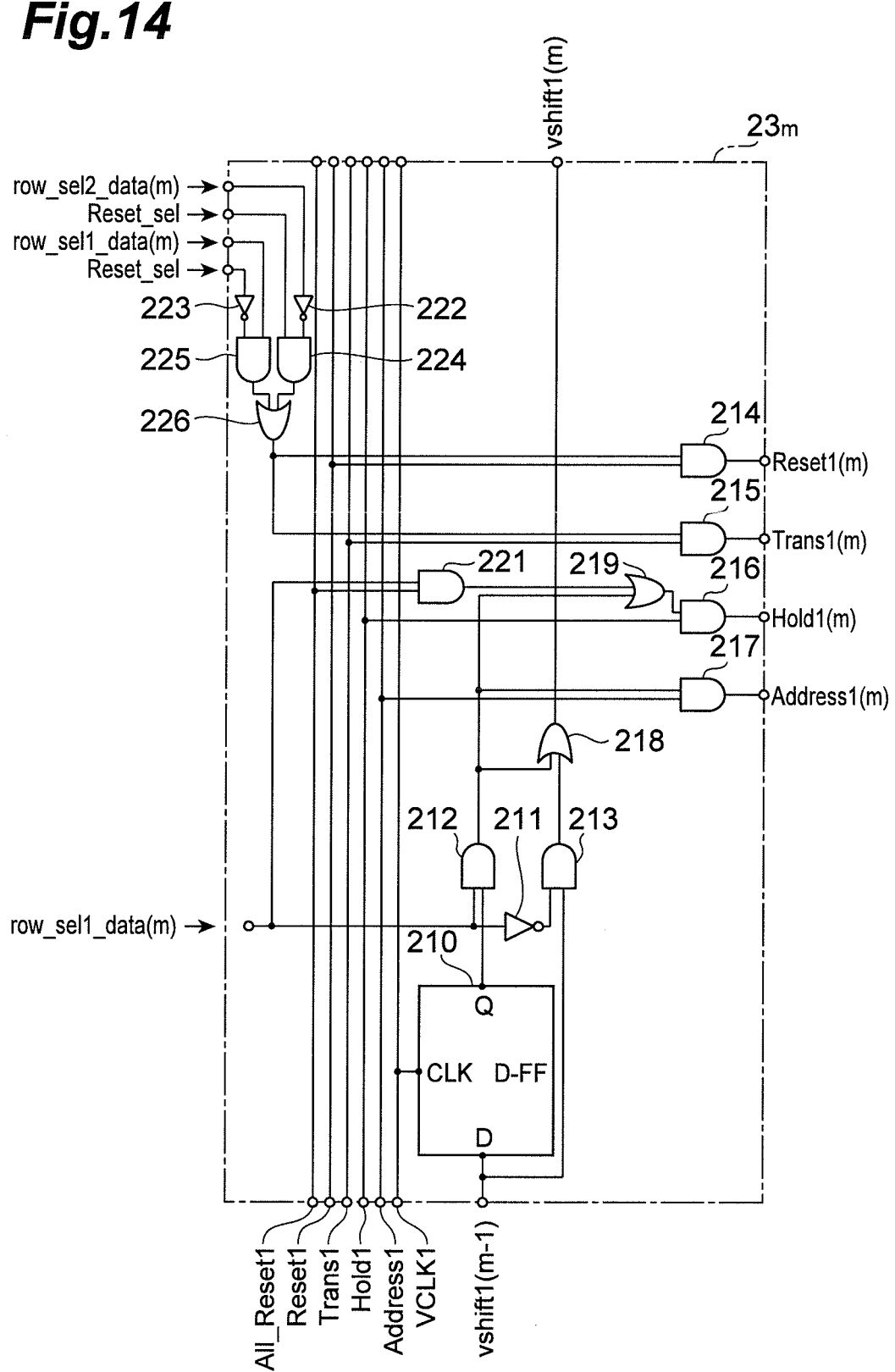
FIG. 14 is a diagram showing a configuration of a control signal generating circuit $23_m$ of the first row selecting section 20A of the solid-state imaging device 2 according to the second embodiment.

FIG. 14 is a diagram showing a configuration of a control signal generating circuit $23_m$ of the first row selecting section 20A of the solid-state imaging device 2 according to the second embodiment. Each control signal generating circuit $23_m$ includes a D flip-flop 210, a NOT circuit 211, AND circuits 212 to 217, OR circuits 218 and 219, an AND circuit 221, NOT circuits 222 and 223, AND circuits 224 and 225, and an OR circuit 226. An All_reset1 signal, a Reset1 signal, a Trans1 signal, a Hold1 signal, an Address1 signal, and a Reset_sel signal are input as the basic control signal 1 described in FIG. 13 to each control signal generating circuit $23_m$.

As compared with the configuration of the control signal generating circuit $21_m$ according to the first embodiment shown in FIG. 6, the control signal generating circuit $23_m$ according to the second embodiment shown in FIG. 14 is different in the point that the NOT circuit 223, the AND circuits 224 to 225, and the OR circuit 226 are further included.

The AND circuit 224 of each control signal generating circuit $23_m$ allows data logic-inverted from data row_sel2_data[m] output from a corresponding latch circuit $32_m$ of the second row selecting section 30A by the NOT circuit 222 to be input thereto, and allows the Reset_sel signal as well to be input thereto, and outputs data of logical conjunction of these.

The AND circuit 225 of each control signal generating circuit $23_m$ allows data row_sel1_data[m] output from a corresponding latch circuit $22_m$ to be input thereto, and allows data logic-inverted from the Reset_sel signal by the NOT circuit 223 as well to be input thereto, and outputs data of logical conjunction of these.

The OR circuit 226 of each control signal generating circuit $23_m$ allows output data from the AND circuit 224 to be input thereto, and allows output data from the AND circuit 225 as well to be input thereto, and outputs data of logical disjunction of these. That is, the OR circuit 226 outputs data logic-inverted from the data row_sel2_data[m] when the Reset_sel signal is at a high level, and outputs the data row_sel1_data[m] when the Reset_sel signal is at a low level.

The AND circuit 214 of each control signal generating circuit $23_m$ allows output data from the OR circuit 226 to be input thereto, and allows data of the Reset1 signal as well to be input thereto, and outputs data of logical conjunction of these as a Reset1(m) signal.

The AND circuit 215 of each control signal generating circuit $23_m$ allows output data from the OR circuit 226 to be input thereto, and allows data of the Trans1 signal as well to be input thereto, and outputs data of logical conjunction of these as a Trans1(m) signal.

Figure 15:
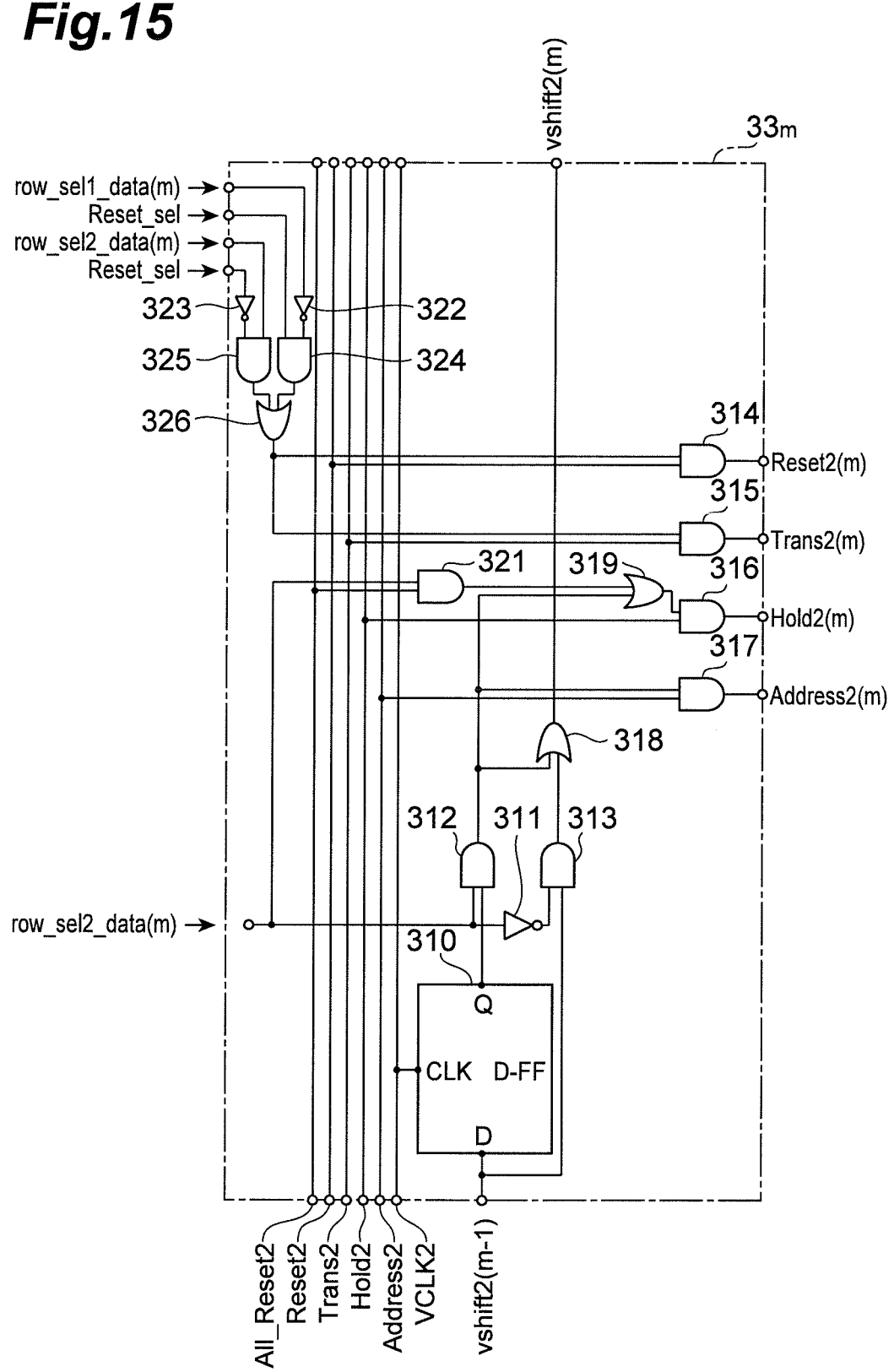
FIG. 15 is a diagram showing a configuration of a control signal generating circuit $33_m$ of the second row selecting section 30A of the solid-state imaging device 2 according to the second embodiment.

FIG. 15 is a diagram showing a configuration of a control signal generating circuit $33_m$ of the second row selecting section 30A of the solid-state imaging device 2 according to the second embodiment. Each control signal generating circuit $33_m$ includes a D flip-flop 310, a NOT circuit 311, AND circuits 312 to 317, OR circuits 318 and 319, an AND circuit 321, NOT circuits 322 and 323, AND circuits 324 and 325, and an OR circuit 326. An All_reset2 signal, a Reset2 signal, a Trans2 signal, a Hold2 signal, an Address2 signal, and a Reset_sel signal are input as the basic control signal 2 described in FIG. 13 to each control signal generating circuit $33_m$.

As compared with the configuration of the control signal generating circuit $31_m$ according to the first embodiment shown in FIG. 7, the control signal generating circuit $33_m$ according to the second embodiment shown in FIG. 15 is different in the point that the NOT circuits 322 and 323, the AND circuits 324 and 325, and the OR circuit 326 are further included.

The AND circuit 324 of each control signal generating circuit $33_m$ allows data logic-inverted from data row_sel1_data[m] output from a corresponding latch circuit $22_m$ of the first row selecting section 20A by the NOT circuit 322 to be input thereto, and allows the Reset_sel signal as well to be input thereto, and outputs data of logical conjunction of these.

The AND circuit 325 of each control signal generating circuit $33_m$ allows data row_sel2_data[m] output from a corresponding latch circuit $32_m$ to be input thereto, and allows data logic-inverted from the Reset_sel signal by the NOT circuit 323 as well to be input thereto, and outputs data of logical conjunction of these.

The OR circuit 326 of each control signal generating circuit $33_m$ allows output data from the AND circuit 324 to be input thereto, and allows output data from the AND circuit 325 as well to be input thereto, and outputs data of logical disjunction of these. That is, the OR circuit 326 outputs data logic-inverted from the data row_sel1_data[m] when the Reset_sel signal is at a high level, and outputs the data row_sel2_data[m] when the Reset_sel signal is at a low level.

The AND circuit 314 of each control signal generating circuit $33_m$ allows output data from the OR circuit 326 to be input thereto, and allows data of the Reset2 signal as well to be input thereto, and outputs data of logical conjunction of these as a Reset2(m) signal.

The AND circuit 315 of each control signal generating circuit $33_m$ allows output data from the OR circuit 326 to be input thereto, and allows data of the Trans2 signal as well to be input thereto, and outputs data of logical conjunction of these as a Trans2(m) signal.

Any one of the first row selecting section 20A and the second row selecting section 30A with the configurations shown in FIGS. 13 to 15 is capable of performing the function of outputting a control signal to each pixel unit $P_{m3,n}$ of the m3-th row in the light receiving section 10, thereby discharging the junction capacitance section of the photodiode PD according to the Reset_sel signal being at a high level or a low level.

In the case where the Reset_sel signal is at a high level, the first row selecting section 20A in the second embodiment has the same function as the first row selecting section 20 in the first embodiment, and the second row selecting section 30A in the second embodiment has the same function as the second row selecting section 30 in the first embodiment. That is, the first row selecting section 20A has the function of outputting a control signal to each pixel unit $P_{m3,n}$ of the m3-th row in the light receiving section 10, thereby discharging the junction capacitance section of the photodiode PD. Accordingly, in this case, the solid-state imaging device 2 according to the second embodiment is capable of operating in the same way as the solid-state imaging device 1 according to the first embodiment.

On the other hand, in the case where the Reset_sel signal is at a low level, the second row selecting section 30A has the function of outputting a control signal to each pixel unit $P_{m3,n}$ of the m3-th row in the light receiving section 10, thereby discharging the junction capacitance section of the photodiode PD. Except for this point, the solid-state imaging device 2 according to the second embodiment is capable of operating in the same way as the solid-state imaging device 1 according to the first embodiment.

(Third Embodiment)

Next, a third embodiment will be described. In the solid-state imaging device 1 according to the first embodiment and the solid-state imaging device 2 according to the second embodiment, the first row selecting section or the second row selecting section is to discharge the junction capacitance section of the photodiode PD of each pixel unit $P_{m3,n}$ of the m3-th row. On the other hand, in a solid-state imaging device 3 according to the third embodiment, a third row selecting section which outputs a control signal to each pixel unit $P_{m3,n}$ of the m3-th row in the light receiving section 10, thereby discharging the junction capacitance section of the photodiode PD is further included. In this way, the junction capacitance section of the photodiode PD of each pixel unit $P_{m3,n}$ of the m3-th row may be discharged by the third row selecting section in place of the first row selecting section or the second row selecting section.

Figure 16:
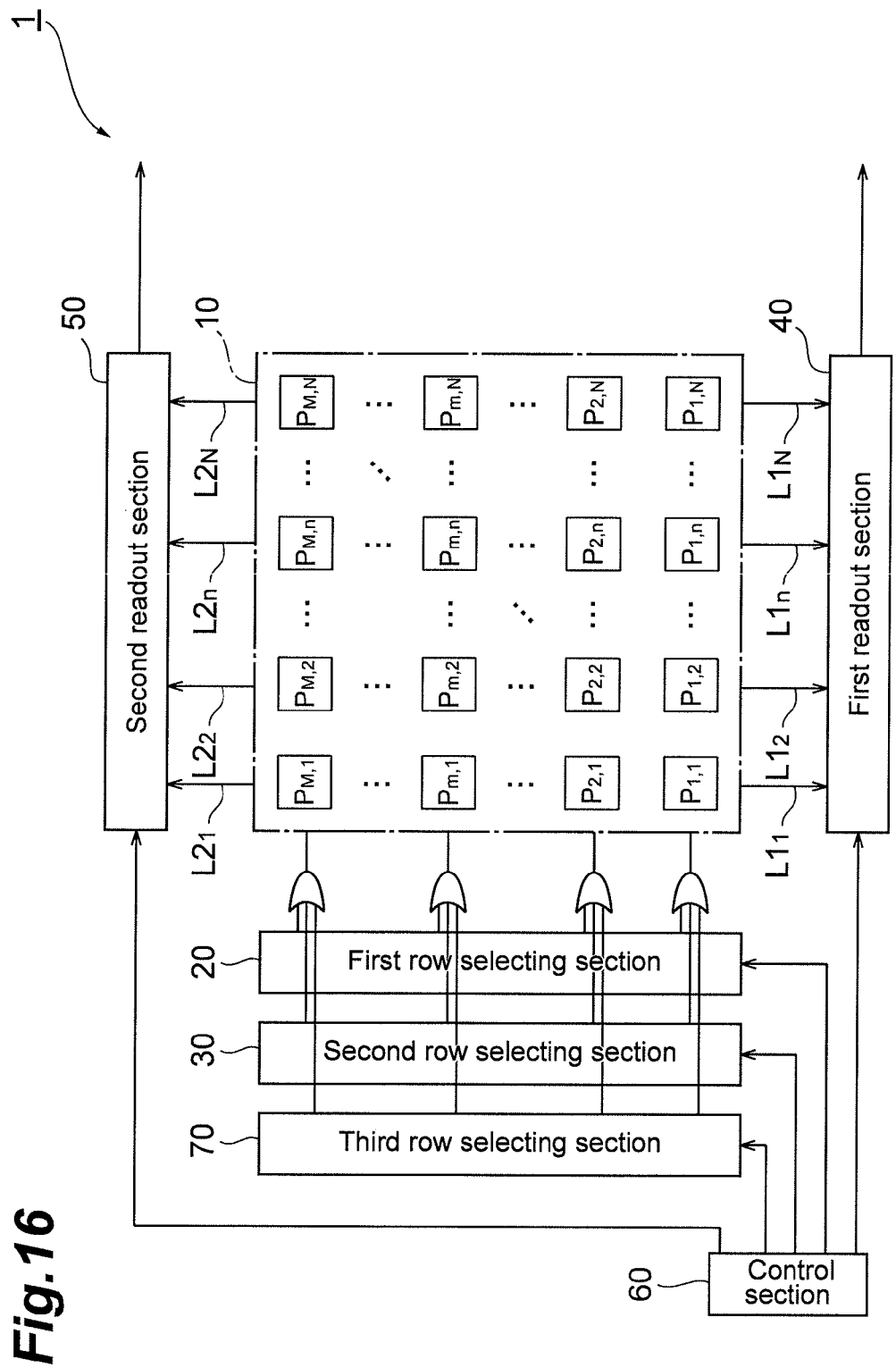
FIG. 16 is a diagram showing a schematic configuration of a solid-state imaging device 3 according to a third embodiment.

FIG. 16 is a diagram showing a schematic configuration of the solid-state imaging device 3 according to the third embodiment. As compared with the schematic configuration of the solid-state imaging device 1 according to the first embodiment shown in FIG. 1, the solid-state imaging device 3 according to the third embodiment shown in FIG. 16 is different in the point that a third row selecting section 70 is further included. The light receiving section 10, the first row selecting section 20, the second row selecting section 30, the first readout section 40, the second readout section 50, and the control section 60 are respectively the same as those in the first embodiment and the second embodiment.

In place of the first row selecting section 20 or the second row selecting section in the first embodiment and the second embodiment, the third row selecting section 70 selects any m3-th row in the light receiving section 10, and outputs a control signal to each pixel unit $P_{m3,n}$ of the m3-th row, thereby discharging a junction capacitance section of the photodiode, and accumulating charge generated in the photodiode in the charge accumulating section.

Here, m1 and m2 are integers not less than 1 and not more than M, which are different from each other. m3 is an integer not less than 1 and not more than M. The first row selecting section 20 and the second row selecting section 30 select rows different from each other in the light receiving section 10. The number of rows selected by each of the first row selecting section 20 and the second row selecting section 30 is arbitrary. However, the output of data is sequentially carried out with respect to every single row. The number of rows selected by the third row selecting section 70 as well is arbitrary.

The control section 60 controls respective operations of the first row selecting section 20, the second row selecting section 30, the third row selecting section 70, the first readout section 40, and the second readout section 50, to control the entire operation of the solid-state imaging device 3. The first row selecting section 20 and the first readout section 40, the second row selecting section 30 and the second readout section 50 are capable of operating in parallel with each other under the control of the control section 60.

Figure 17:
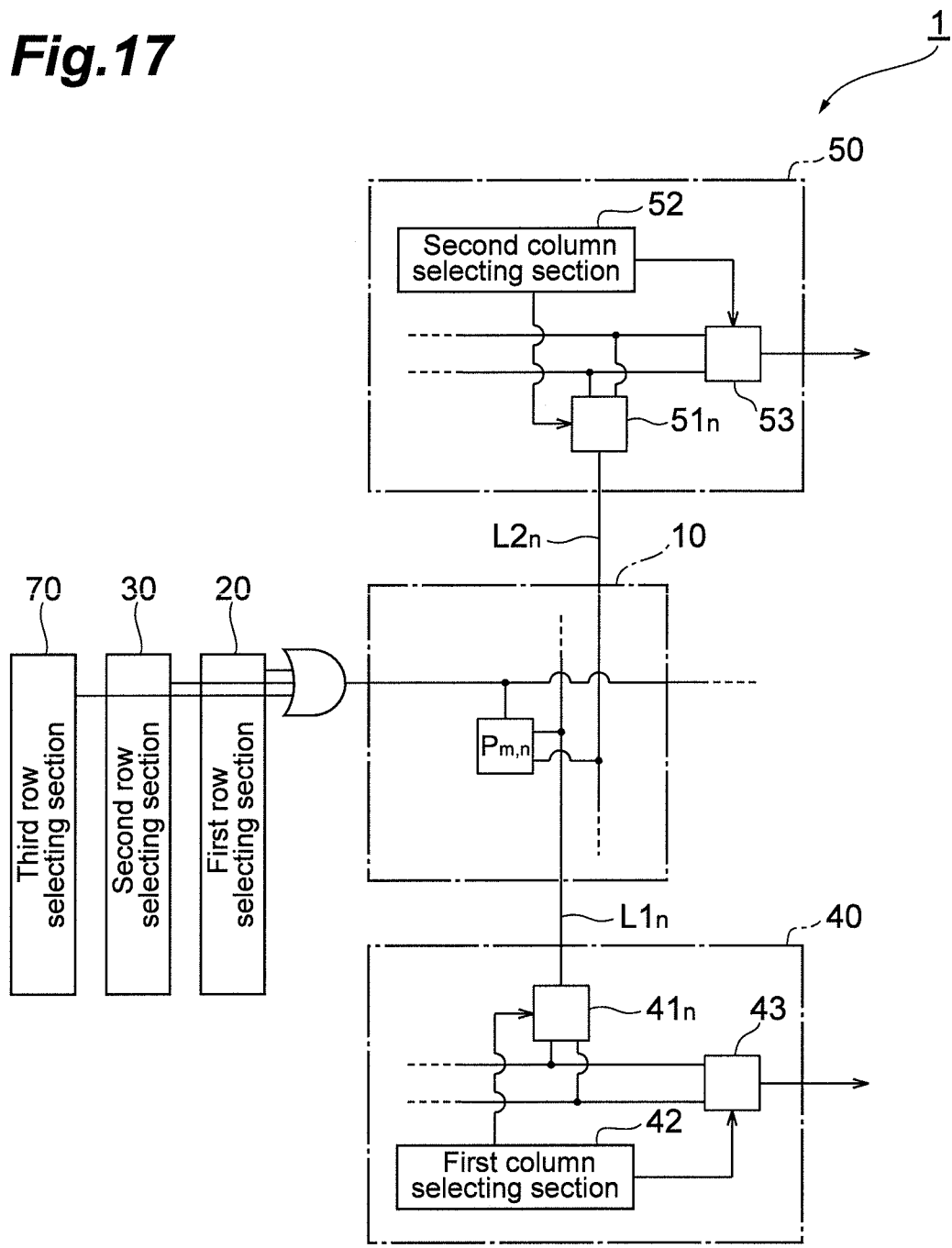
FIG. 17 is a diagram showing configurations of a first readout section 40 and a second readout section 50 of the solid-state imaging device 3 according to the third embodiment.

FIG. 17 is a diagram showing, in the same way as in FIG. 2, configurations of the first readout section 40 and the second readout section 50 of the solid-state imaging device 3 according to the third embodiment. The description of FIG. 17 is the same as the description of FIG. 2 described above, which is therefore omitted.

Figure 18:
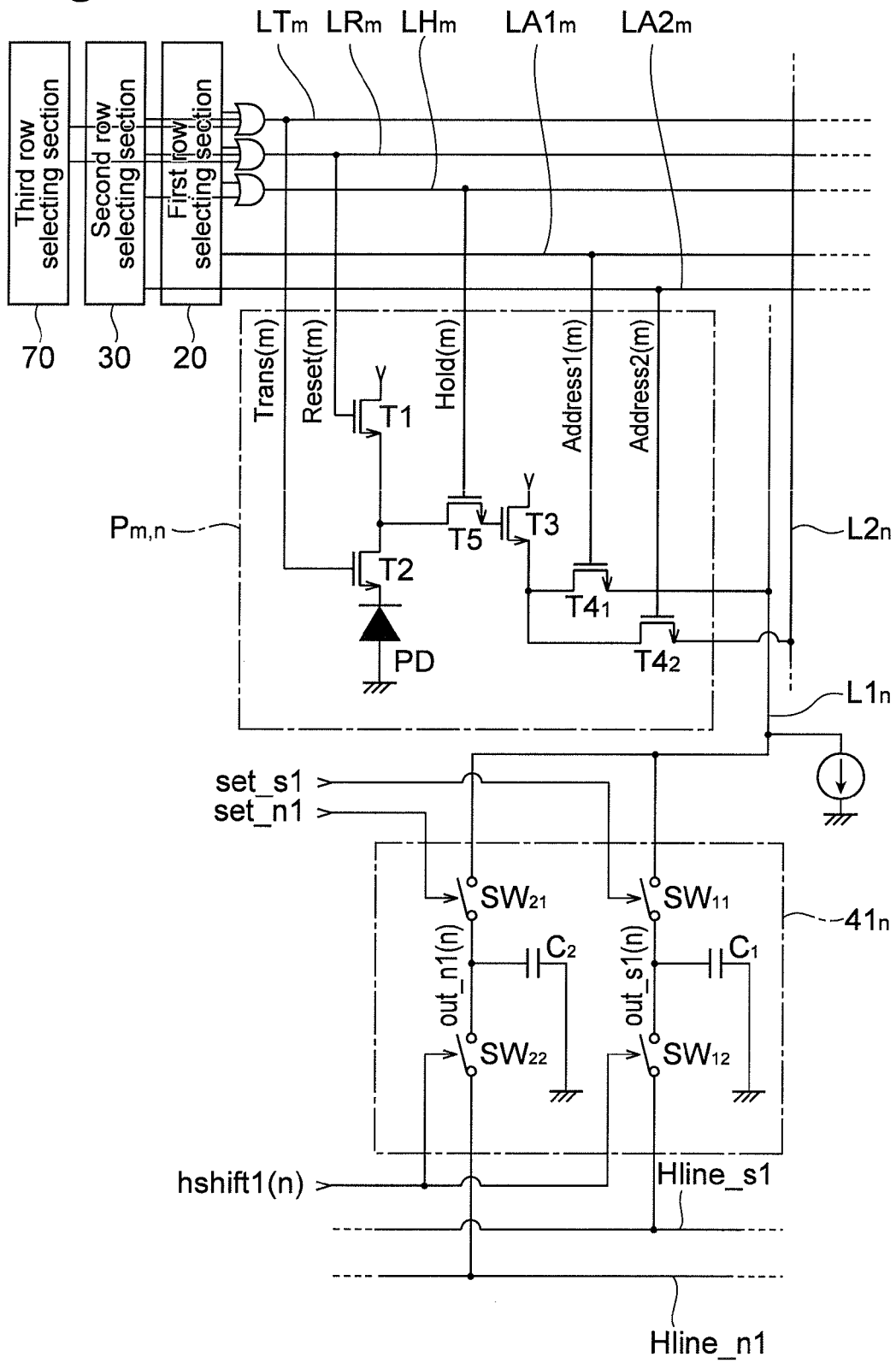
FIG. 18 is a diagram showing circuit configurations of a pixel unit $P_{m,n}$ and a holding section $41_n$ of the solid-state imaging device 3 according to the third embodiment.

FIG. 18 is a diagram showing, in the same way as in FIG. 3, circuit configurations of a pixel unit $P_{m,n}$ and a holding section $41_n$ of the solid-state imaging device 3 according to the third embodiment. The description of FIG. 18 is the same as the description of FIG. 3 described above, which is therefore omitted.

In addition, in FIG. 18, a Reset(m) signal is a logical disjunction of a Reset1(m) signal output from the first row selecting section 20, a Reset2(m) signal output from the second row selecting section 30, and a Reset3(m) signal output from the third row selecting section 70. Further, a Trans(m) signal is a logical disjunction of a Trans1(m) signal output from the first row selecting section 20, a Trans2(m) signal output from the second row selecting section 30, and a Trans3(m) signal output from the third row selecting section 70.

Figure 19:
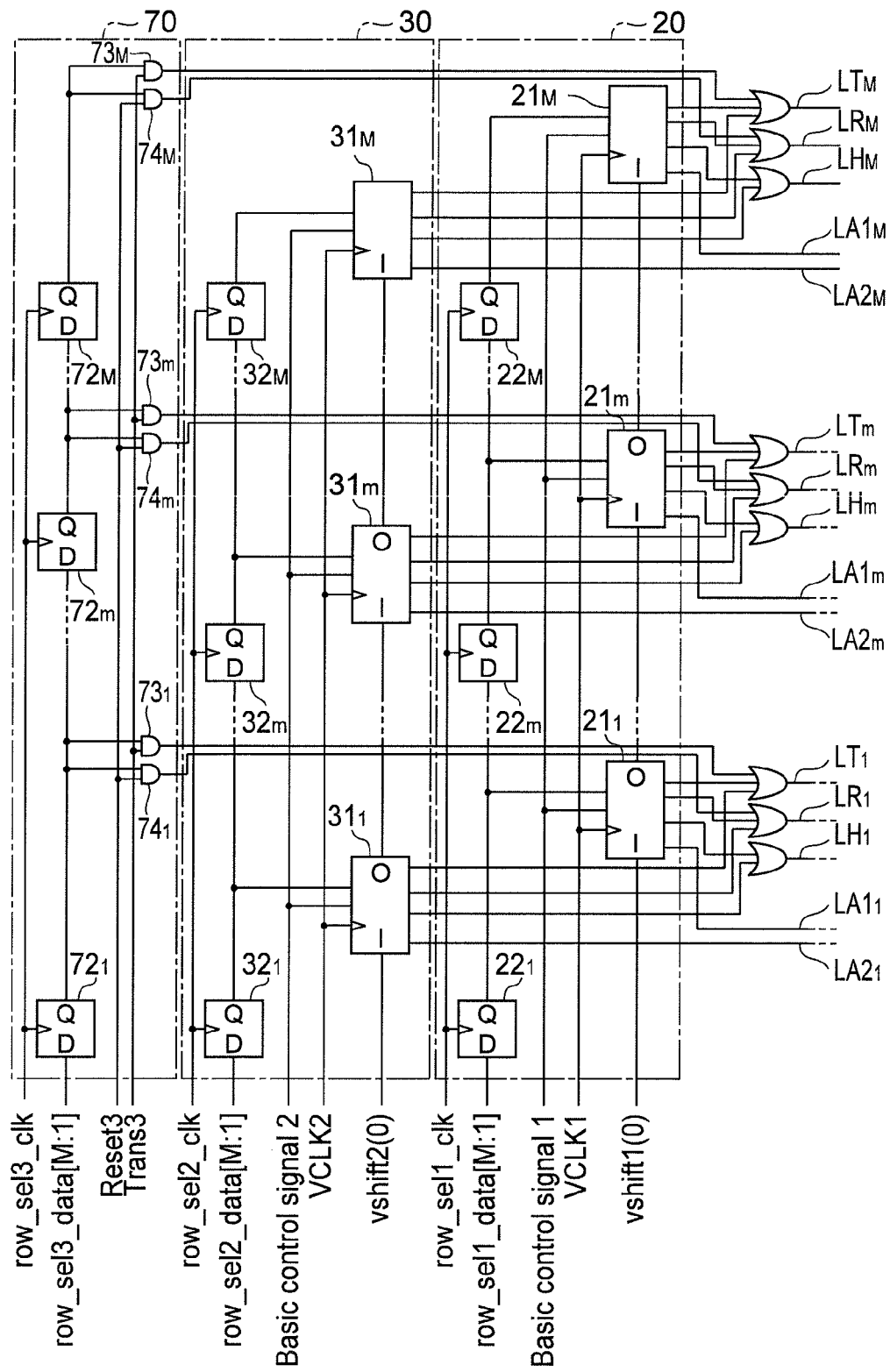
FIG. 19 is a diagram showing configurations of a first row selecting section 20, a second row selecting section 30, and a third row selecting section 70 of the solid-state imaging device 3 according to the third embodiment.

FIG. 19 is a diagram showing, in the same way as in FIG. 5, configurations of the first row selecting section 20, the second row selecting section 30, and the third row selecting section 70 of the solid-state imaging device 3 according to the third embodiment. In addition, the description of the first row selecting section 20 and the second row selecting section 30 are the same as the description of FIG. 5 described above, which is therefore omitted. The third row selecting section 70 includes M latch circuits $72_1$ to $72_M$ composing a shift register, M AND circuits $73_1$ to $73_M$, and M AND circuits $74_1$ to $74_M$.

The respective M latch circuits $72_1$ to $72_M$ included in the third row selecting section 70 are each a D flip-flop, and these are sequentially cascade-connected. That is, an input terminal D of each latch circuit $72_m$ is connected to an output terminal Q of a latch circuit $72_{m-1}$ at the previous stage (here, m is an integer not less than 2 and not more than M). M-bit data row_sel3_data[M:1] are serial-input to the input terminal D of the latch circuit $72_1$ at the first stage. Each latch circuit $72_m$ operates in synchronization with a clock row_sel3_clk, to be capable of holding the data row_sel3_data[m].

Each AND circuit $73_m$ included in the third row selecting section 70 allows data row_sel3_data[m] output from a latch circuit $72_m$ to be input thereto, and allows data of the Trans3 signal as well to be input thereto, and outputs data of logical conjunction of these as Trans3(m) signal. Each AND circuit $74_m$ allows data row_sel3data[m] output from a latch circuit $72_m$ to be input thereto, and allows data of the Reset3 signal as well to be input thereto, and outputs data of logical conjunction of these as Reset3(m) signal.

The third row selecting section 70 is provided with a Trans3 signal, a Reset3 signal, M-bit data row_sel3_data[M:1], and a clock row_sel3_clk from the control section 60.

In the case where the data row_sel3_data[m3] held in an m3-th latch circuit $72_{m3}$ among the M latch circuits $72_1$ to $72_M$ is at a high level, the third row selecting section 70 is capable of outputting control signals (a Reset3(m3) signal, a Trans3 (m3) signal) to each pixel unit $P_{m3,n}$ of the m3-th row as being at a high level at predetermined timings.

Figure 20:
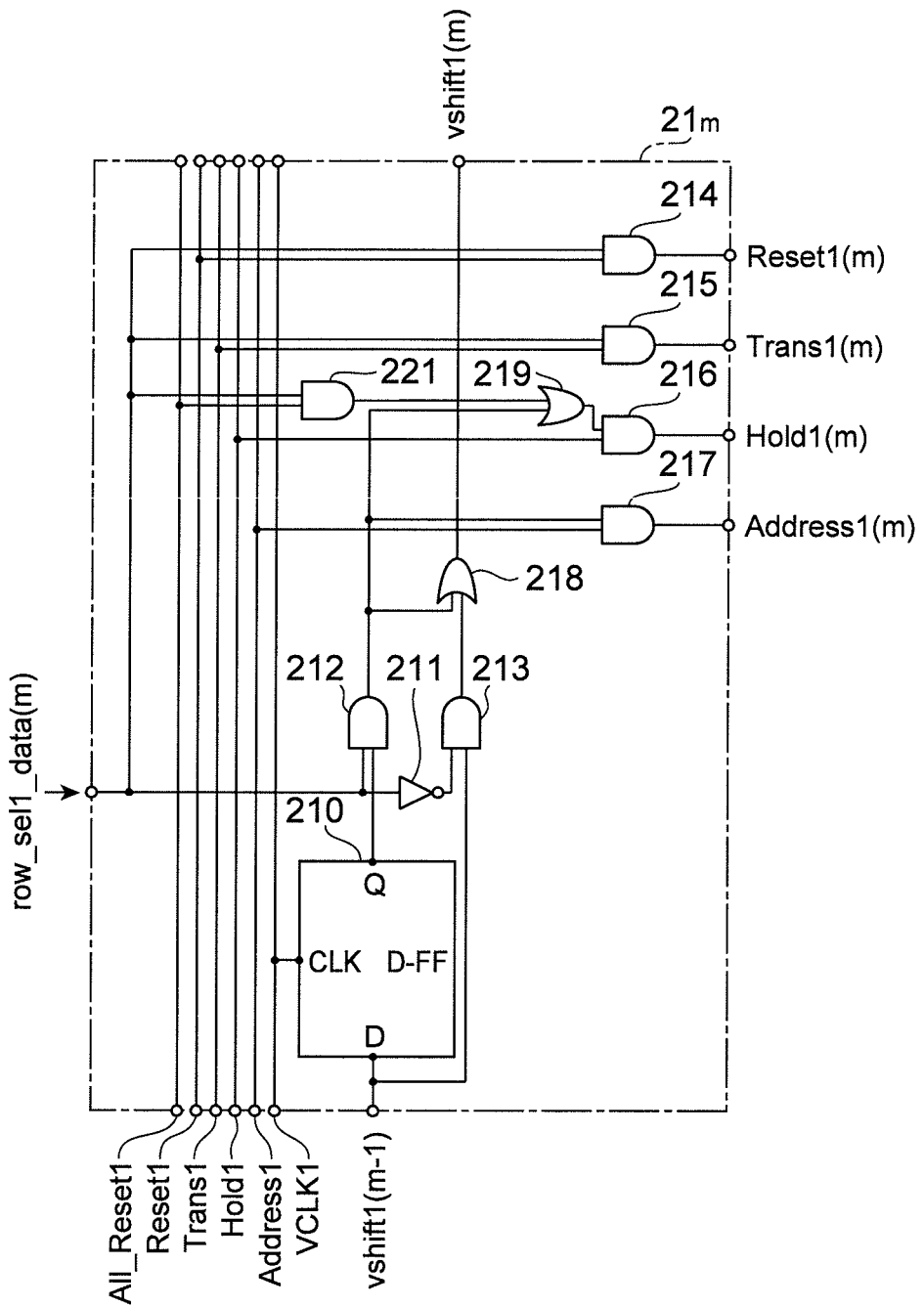
FIG. 20 is a diagram showing a configuration of a control signal generating circuit $21_m$ of the first row selecting section 20 of the solid-state imaging device 3 according to the third embodiment.

FIG. 20 is a diagram showing, in the same way as in FIG. 6, a configuration of a control signal generating circuit $21_m$ of the first row selecting section 20 of the solid-state imaging device 3 according to the third embodiment. In FIG. 20, the configuration is different from the configuration of FIG. 6 in the point that each control signal generating circuit $21_m$ does not include the NOT circuit 222. That is, as shown below, the input to the AND circuits 214 and 215 is different. The descriptions of the other configurations are the same as the description of FIG. 6 described above, which is therefore omitted.

The AND circuit 214 of each control signal generating circuit $21_m$ allows data row_sel1_data[m] output from a corresponding latch circuit $22_m$ to be input thereto, and allows data of the Reset1 signal as well to be input thereto, and outputs data of logical conjunction of these as a Reset1(m) signal.

The AND circuit 215 of each control signal generating circuit $21_m$ allows data row_sel1_data[m] output from a corresponding latch circuit $22_m$ to be input thereto, and allows data of the Trans1 signal as well to be input thereto, and outputs data of logical conjunction of these as a Trans1(m) signal.

As described above, the data row_sel1_data[m1] is set to a high level so as to correspond to the m1-th row to be selected by the first row selecting section 20. The data row_sel2_data

[m2] is set to a high level so as to correspond to the m2-th row to be selected by the second row selecting section 30. Further, the data row_sel3_data[m3] is set to a high level so as to correspond to the m3-th row to be selected by the third row selecting section 70. In order to make the m1-th row selected by the first row selecting section 20 and the m2-th row selected by the second row selecting section 30 be different from each other, it is necessary for the data row_sel1_data[m] and the data row_sel2_data[m]both to be not at a high level, and for at least one of these to be at a low level with respect to each m value.

Then, as described above, in the case where the data row_sel1_data[m1] held in an m1-th latch circuit $22_{m1}$ among the M latch circuits $22_1$ to $22_M$ is at a high level, the first row selecting section 20 is capable of outputting a Reset1 (m1) signal, a Trans1(m1) signal, a Hold1 (m1) signal, and an Address1(m1) signal to each pixel unit $P_{m1,n}$ of the m1-th row as being at a high level at predetermined timings. In the case where the data row_sel2_data[m2] held in an m2-th latch circuit $32_{m2}$ among the M latch circuits $32_1$ to $32_M$ is at a high level, the second row selecting section 30 is capable of outputting a Reset2(m2) signal, a Trans2(m2) signal, a Hold2 (m2) signal, and an Adress2(m2) signal to each pixel unit $P_{m3,n}$ of the m2-th row as being at a high level at predetermined timings. Further, in the case where the data row_sel3_data[m3] held in an m3-th latch circuit $72_{m3}$ among the M latch circuits $72_1$ to $72_M$ is at a high level, the third row selecting section 70 is capable of outputting a Reset3(m3) signal and a Trans3(m3) signal to each pixel unit $P_{m3,n}$ of the m3-th row as being at a high level at predetermined timings.

Next, in comparison with the comparison example described above (FIGS. 8 and 9), an embodiment (FIG. 8 and FIG. 21) of the operation of the solid-state imaging device 3 according to the third embodiment will be described. In this embodiment as well, it is assumed that M=N=8.

The pixel units in the light receiving section 10 from which data are read out by the first readout section 40 and the second readout section 50 respectively in a case of the operation of the embodiment are the same as those shown in FIG. 8. However, in the embodiment, the junction capacitance section of the photodiode PD in each pixel unit of the fourth row in the light receiving section 10 from which data are read out by the first row selecting section and the first readout section on and after the time t, is initialized at a time earlier by a data readout period of the first readout section than the time t by the third row selecting section 70. Thereby, the data of each pixel unit of the fourth row in the light receiving section 10 are read out at a constant time interval on and after the time of initialization immediately before the time t.

Figure 21:
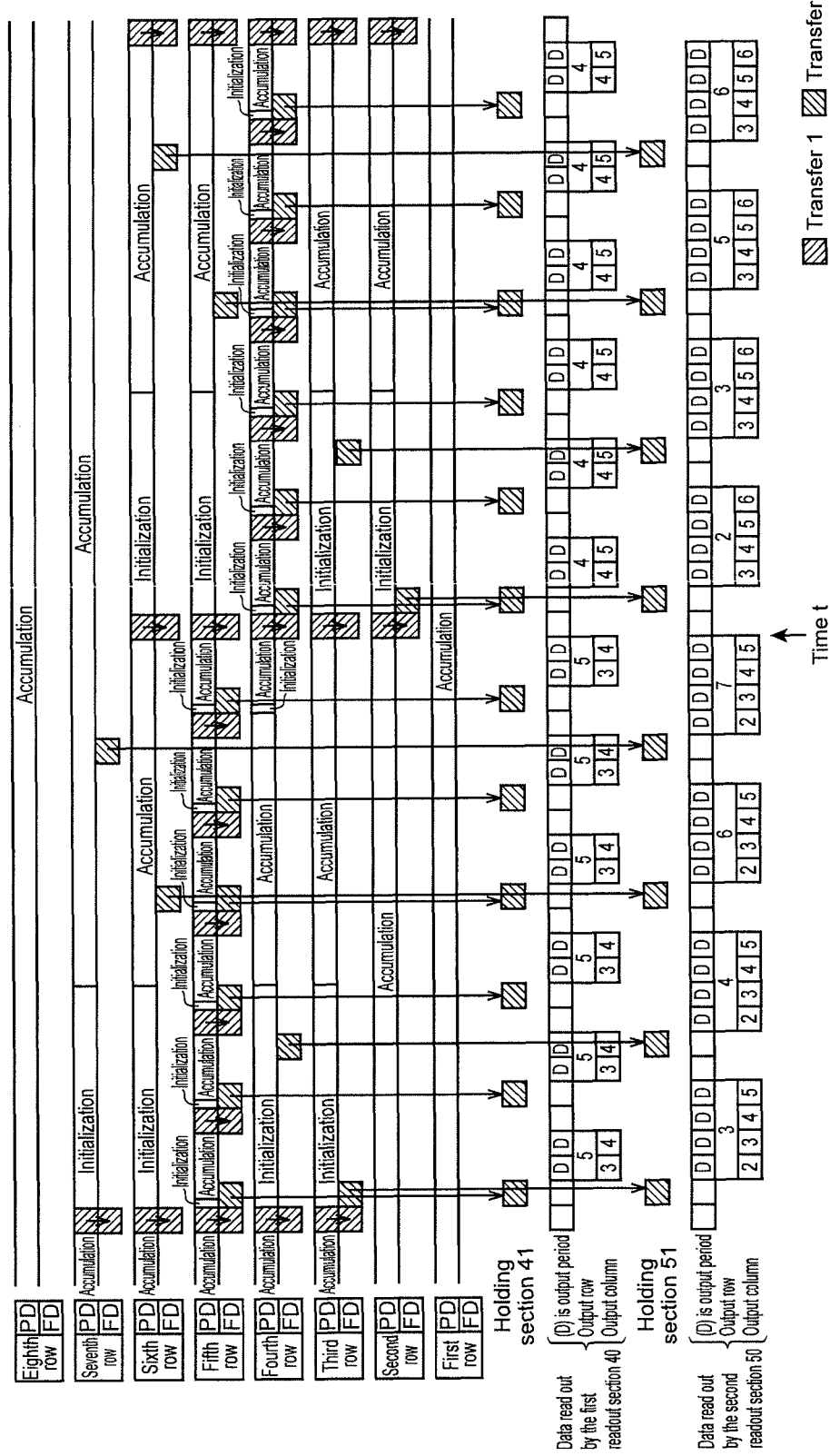
FIG. 21 is a timing chart in a case of the operation of the embodiment.

FIG. 21 is a timing chart in a case of the operation of the embodiment. This figure shows, in order from the top, the operations of the respective pixel units of the eighth row to the first row in the light receiving section 10, the data input operation of the holding section 41 of the first readout section 40, the data output operation from the first readout section 40, the data input operation of the holding section 51 of the second readout section 50, and the data output operation from the second readout section 50. The respective "Transfer 1," "Transfer 2," "Initialization," and "Accumulation" in this figure are the same as those in FIG. 9.

As shown in this figure, in the embodiment, the respective communication data of the pixel unit $P_{4,4}$ and the pixel unit $P_{4,5}$ initially read out by the first readout section 40 immediately after the time t correspond to an amount of the charge accumulated over the same period after the time t, before the time t. Therefore, it is possible to accurately receive an optical signal from an optical signal source. In this way, the solid-state imaging device 1 according to the present embodiment is capable of accurately receiving an optical signal from the optical signal source even in a case where the position of an optical signal source is tracked.

On the other hand, in this embodiment as well, because the respective image data of the pixel units $P_{2,3}$ to $P_{2,6}$ of the second row initially read out by the second readout section 50 immediately after the time t correspond to an amount of the charge finally accumulated over a period longer than usual immediately before the time t, the image data may be wrong values in some cases. Further, because the respective image data of the pixel units $P_{5,3}$ to $P_{5,6}$ of the fifth row initially read out by the second readout section 50 immediately after the time t correspond to an amount of the charge finally accumulated over a period shorter than usual immediately before the time t, the image data may be wrong values in some cases. However, because these data are not communication data but image data, there may be no problem even if the data are wrong, or the wrong data may be interpolated by use of data of the adjacent rows, which does not become a major problem.

In addition, the solid-state imaging device 3 according to the third embodiment is capable of operating in various modes. For example, the first row selecting section 20 may select the odd-numbered rows in the light receiving section 10, and the second row selecting section 30 may select the even-numbered rows in the light receiving section 10. In this case, the position of the optical signal source is specified on the basis of image data of the even-numbered rows read out by the second row selecting section 30 and the second readout section 50, and data from the pixel units of any odd-numbered row at the specified position in the image are read out as communication data by the first row selecting section 20 and the first readout section 40. In this case, the third row selecting section 70 initializes the junction capacitance section of the photodiode PD of each pixel unit of the m3-th row from which the communication data are newly read out in advance of the start of readout.

Figure 22:
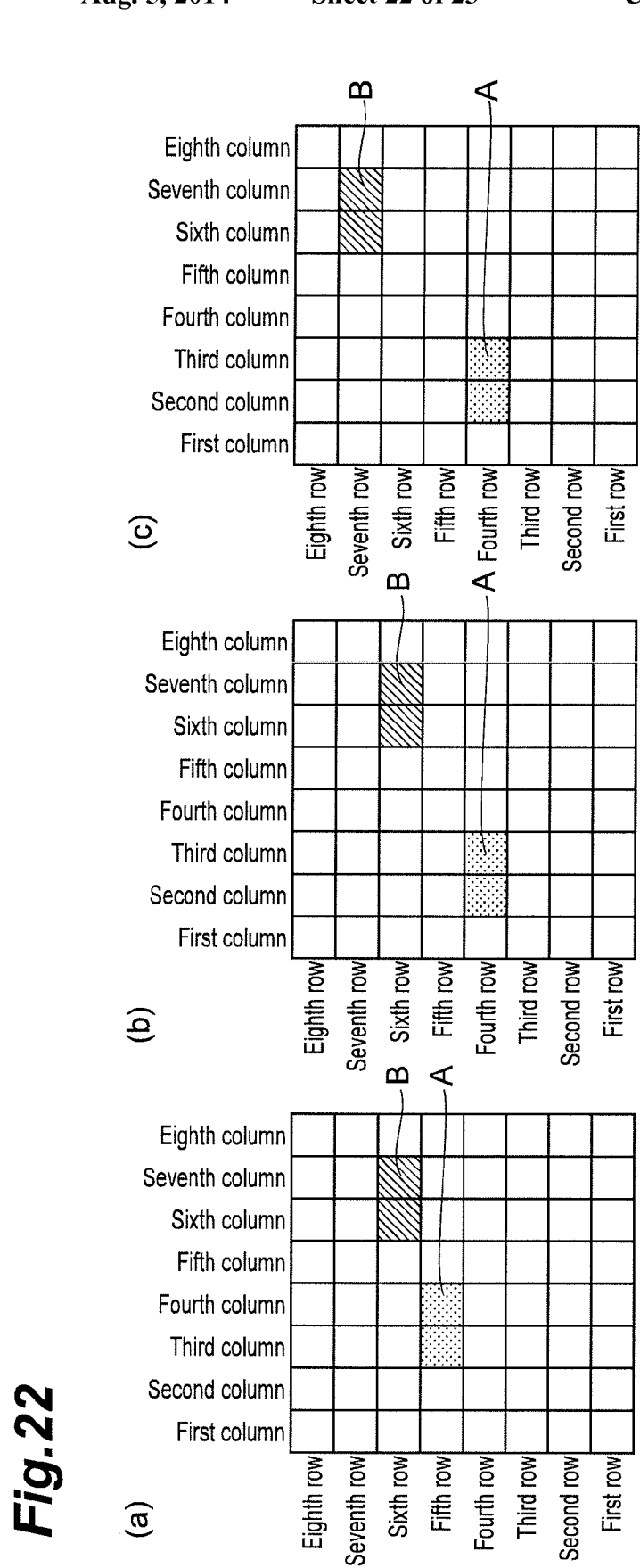
FIG. 22 are diagrams for describing pixel units in the light receiving section 10 from which data are read out by the first readout section 40 and the second readout section 50 respectively in a case of the operation of another embodiment.
Figure 23:
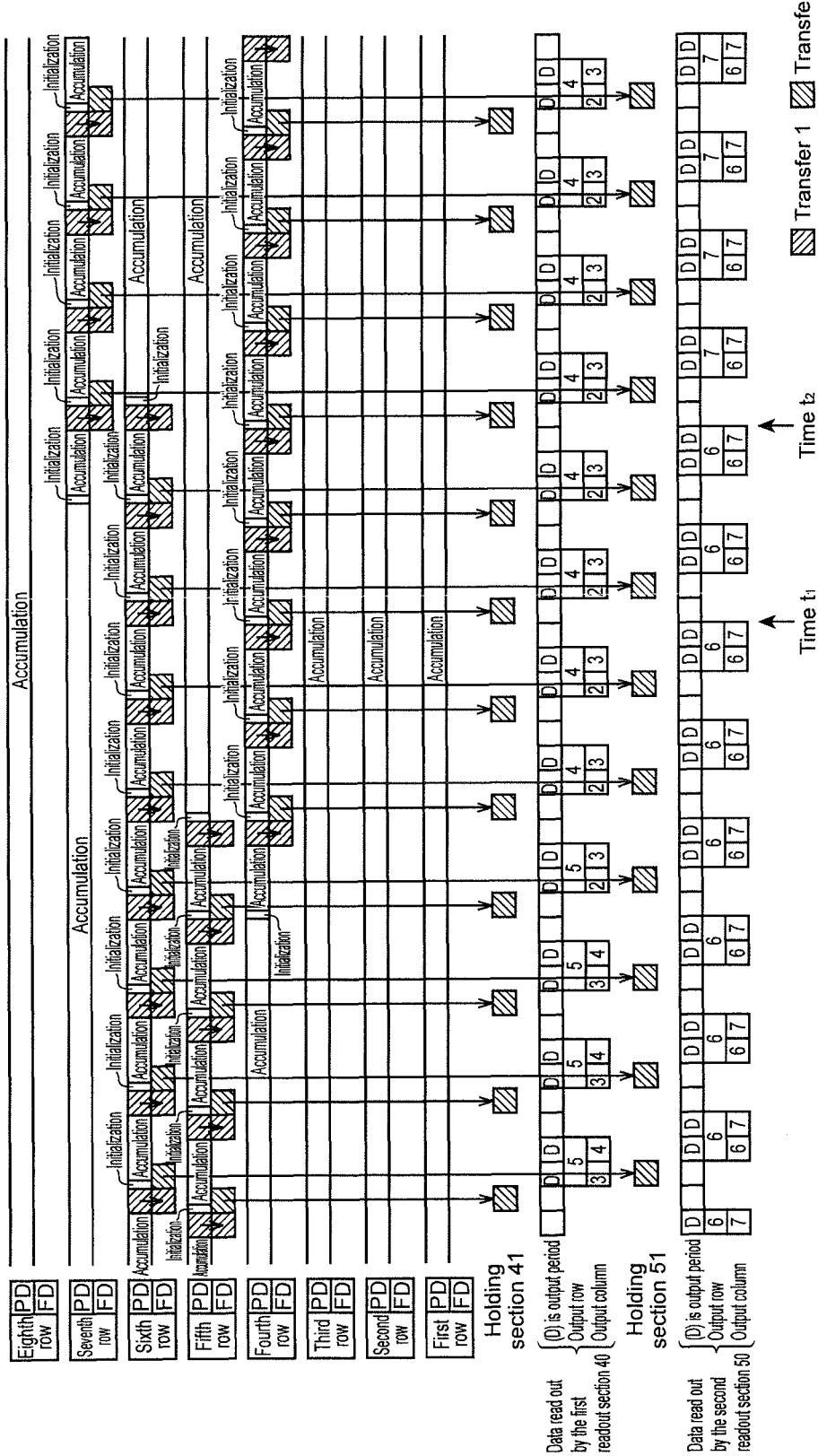
FIG. 23 is a timing chart in a case of the operation of another embodiment.

Further, the solid-state imaging device 3 according to the third embodiment is capable of operating as shown in FIGS. 22 and 23.

FIG. 22 are diagrams for describing pixel units in the light receiving section 10 from which data are read out by the first readout section 40 and the second readout section 50 respectively in a case of the operation of another embodiment. In this embodiment, before a given time $t_1$, as shown in FIG. 22(a), respective communication data of the pixel unit $P_{5,3}$ and the pixel unit $P_{5,4}$ in the light receiving section 10 are read out by the first row selecting section and the first readout section (the region A in FIG. 22(a)), and respective communication data of the pixel unit $P_{6,6}$ and the pixel unit $P_{6,7}$ in the light receiving section 10 are read out by the second row selecting section and the second readout section (the region B in FIG. 22(a)).

From the time $t_1$ to a time $t_2$, as shown in FIG. 22(b), respective communication data of the pixel unit $P_{4,2}$ and the pixel unit $P_{4,3}$ in the light receiving section 10 are read out by the first row selecting section and the first readout section (the region A in FIG. 22(b)), and respective communication data of the pixel unit $P_{6,6}$ and the pixel unit $P_{6,7}$ in the light receiving section 10 are read out by the second row selecting section and the second readout section (the region B in FIG. 22(b)). Then, on and after the time $t_2$, as shown in FIG. 22(c), respective communication data of the pixel unit $P_{4,2}$ and the pixel unit $P_{4,3}$ in the light receiving section 10 are read out by the first row selecting section and the first readout section (the region A in FIG. 22(c)), and respective communication data of the pixel unit $P_{7,6}$ and the pixel unit $P_{7,7}$ in the light receiving section 10 are read out by the second row selecting section and the second readout section (the region B in FIG. 22(c)).

That is, in this embodiment, the two optical signal sources which are independently movable between each other are present, and data of an optical signal from one of the optical signal sources are read out by the first row selecting section and the first readout section, and data of an optical signal from the other optical signal source are read out by the second row selecting section and the second readout section.

FIG. 23 is a timing chart in a case of the operation of another embodiment. This figure shows, in order from the top, the operations of the respective pixel units of the eighth row to the first row in the light receiving section 10, the data input operation of the holding section 41 of the first readout section 40, the data output operation from the first readout section 40, the data input operation of the holding section 51 of the second readout section 50, and the data output operation from the second readout section 50. The respective "Transfer 1," "Transfer 2," "Initialization," and "Accumulation" in this figure are the same as those in FIG. 9. As shown in this figure, the data read out by the first readout section and the data read out by the second readout section are the same in period with each other, but different in phase.

The rows whose data are read out by the first row selecting section and the first readout section are changed with the time $t_1$ serving as a boundary. Meanwhile, the respective communication data of the pixel unit $P_{4,2}$ and the pixel unit $P_{4,3}$ initially read out by the first readout section immediately after the time $t_1$ correspond to an amount of the charge accumulated over the same period after the time $t_1$, before the time $t_1$. Further, the rows whose data are read out by the second row selecting section and the second readout section are changed with the time $t_2$ serving as a boundary. Meanwhile, the respective communication data of the pixel unit $P_{7,6}$ and the pixel unit $P_{7,7}$ initially read out by the second readout section immediately after the time $t_2$ correspond to an amount of the charge accumulated over the same period after the time $t_2$, before the time $t_2$. Therefore, it is possible to accurately receive an optical signal from each of the two optical signal sources. In this way, the solid-state imaging device 1 according to the present embodiment is capable of accurately receiving an optical signal from each optical signal source even in a case where the respective positions of the two optical signal sources are tracked.

Industrial Applicability

The present invention is applicable for use for accurately receiving an optical signal from the optical signal source even in a case where the position of an optical signal source is tracked in a solid-state imaging device for optical communication.

REFERENCE SIGNS LIST 1, 2, 3 ... Solid-state imaging device
10 ... Light receiving section
20, 20A ... First row selecting section
$21_1$ to $21_M$ ... Control signal generating circuit
$22_1$ to $22_M$ ... Latch circuit
$23_1$ to $23_M$ ... Control signal generating circuit
30, 30A ... Second row selecting section
$31_1$ to $31_M$ ... Control signal generating circuit
$32_1$ to $32_M$ ... Latch circuit
$33_1$ to $33_M$ ... Control signal generating circuit
40 ... First readout section
$41_1$ to $41_N$ ... Holding section
42 ... First column selecting section
43 ... Difference arithmetic section
50 ... Second readout section
$51_1$ to $51_N$ ... Holding section
52 ... First column selecting section
53 ... Difference arithmetic section
60, 60A ... Control section
70 ... Third row selecting section
$72_1$ to $72_M$ ... Latch circuit
$P_{1,1}$ to $P_{M,N}$ ... Pixel unit
$L1_1$ to $L1_N$, $L2_1$ to $L2_N$ ... Readout signal line
$LT_1$ to $LT_M$, $LR_1$ to $LR_M$, $LH_1$ to $LH_M$, $LA1_1$ to $LA1_m$, $LA2_1$ to $LA2_M$ ...
Control signal line

The invention claimed is:

1. A solid-state imaging device comprising:
a light receiving section where M×N pixel units $P_{1,1}$ to $P_{M,N}$ each including a photodiode that generates charge of an amount according to an incident light amount, a charge accumulating section in which the charge is accumulated, a first switch for outputting data corresponding to an accumulated charge amount in the charge accumulating section, and a second switch for outputting data corresponding to the accumulated charge amount in the charge accumulating section are two-dimensionally arrayed in M rows and N columns;
a first row selecting section which selects any m1-th row in the light receiving section, and outputs a control signal to each pixel unit $P_{m1,n}$ of the m1-th row, thereby discharging a junction capacitance section of the photodiode, accumulating the charge generated in the photodiode in the charge accumulating section, and outputting data corresponding to the accumulated charge amount in the charge accumulating section to a readout signal line $L1_n$ by closing the first switch;
a second row selecting section which selects any m2-th row different from the m1-th row in the light receiving section, and outputs a control signal to each pixel unit $P_{m2,n}$ of the m2-th row, thereby discharging a junction capacitance section of the photodiode, accumulating the charge generated in the photodiode in the charge accumulating section, and outputting data corresponding to the accumulated charge amount in the charge accumulating section to a readout signal line $L2_n$ by closing the second switch;
a first readout section which is connected to N readout signal lines $L1_1$ to $L1_N$, for which data output from each pixel unit $P_{m1,n}$ of the m1-th row in the light receiving section selected by the first row selecting section to the readout signal line $L1_n$, is input thereto, and from which data corresponding to an amount of the charge generated in the photodiode of each pixel unit $P_{m1,n}$ of the m1-th row is output; and
a second readout section which is connected to N readout signal lines $L2_1$ to $L2_N$, for which data output from each pixel unit $P_{m2,n}$ of the m2-th row in the light receiving section selected by the second row selecting section to the readout signal line $L2_n$ is input thereto, and from which data corresponding to an amount of the charge generated in the photodiode of each pixel unit $P_{m2,n}$ of the m2-th row is output, wherein
any m3-th row in the light receiving section is selected, and a control signal is output to each pixel unit $P_{m,3,n}$ of the m3-th row, thereby discharging a junction capacitance section of the photodiode, and
the first row selecting section and the first readout section, and the second row selecting section and the second readout section operate in parallel with each other (provided that M and N are integers not less than 2, m1 and m2 are integers not less than 1 and not more than M, m3 is an integer not less than 1 and not more than M, and n is an integer not less than 1 and not more than N).

2. The solid-state imaging device according to claim 1, wherein the first row selecting section or the second row selecting section selects any m3-th row different from the m1-th row and the m2-th row in the light receiving section, and outputs a control signal to each pixel unit $P_{m3,n}$ of the m3-th row, thereby discharging the junction capacitance section of the photodiode (provided that m1, m2, and m3 are integers not less than 1 and not more than M, which are different from each other).

3. The solid-state imaging device according to claim 2, further comprising switching means for switching between the first row selecting section and the second row selecting section, to determine any one of the first row selecting section and the second row selecting section as a row selecting section which outputs a control signal to each pixel unit $P_{m3,n}$ of the m3-th row in the light receiving section, thereby discharging the junction capacitance section of the photodiode.

4. The solid-state imaging device according to claim 2, wherein
the first row selecting section includes M latch circuits, and when data held in an m1-th latch circuit among the M latch circuits is a significant value, the first row selecting section outputs the control signal to each pixel unit of the m1-th row,
the second row selecting section includes M latch circuits, and when data held in an m2-th latch circuit among the M latch circuits is a significant value, the second row selecting section outputs the control signal to each pixel unit $P_{m2,n}$ of the m2-th row, and
any row selecting section of the first row selecting section and the second row selecting section outputs the control signal to each pixel unit $P_{m3,n}$ of the m3-th row when data held in an m3-th latch circuit among the M latch circuits of the other row selecting section is an insignificant value.

5. The solid-state imaging device according to claim 4, wherein
the M latch circuits of each of the first row selecting section and the second row selecting section are cascade-connected in order of the rows, to compose a shift register, and M-bit data is serial-input to a latch circuit at the first stage in the shift register, to cause each latch circuit to hold data.

6. The solid-state imaging device according to claim 4, wherein
the first row selecting section sequentially outputs the control signals at a constant time interval to a plurality of rows corresponding to latch circuits with holding data of significant values among the M latch circuits included in the first row selecting section, and
the second row selecting section sequentially outputs the control signals at a constant time interval to a plurality of rows corresponding to latch circuits with holding data of significant values among the M latch circuits included in the second row selecting section.

7. The solid-state imaging device according to claim 1, further comprising a third row selecting section which selects any m3-th row in the light receiving section, and outputs a control signal to each pixel unit $P_{m3,n}$ of the m3-th row, thereby discharging a junction capacitance section of the photodiode.

8. The solid-state imaging device according to claim 7, wherein
the first row selecting section includes M latch circuits, and when data held in an m1-th latch circuit among the M latch circuits is a significant value, the first row selecting section outputs the control signal to each pixel unit $P_{m1,n}$ of the m1-th row,
the second row selecting section includes M latch circuits, and when data held in an m2-th latch circuit among the M latch circuits is a significant value, the second row selecting section outputs the control signal to each pixel unit $P_{m2,n}$ of the m2-th row, and
the third row selecting section includes M latch circuits, and when data held in an m3-th latch circuit among the M latch circuits is a significant value, the third row selecting section outputs the control signal to each pixel unit $P_{m3,n}$ of the m3-th row.

9. The solid-state imaging device according to claim 8, wherein
the M latch circuits of each of the first row selecting section, the second row selecting section, and the third row selecting section are cascade-connected in order of the rows, to compose a shift register, and M-bit data is serial-input to a latch circuit at the first stage in the shift register, to cause each latch circuit to hold data.

10. The solid-state imaging device according to claim 8, wherein
the first row selecting section sequentially outputs the control signals at a constant time interval to a plurality of rows corresponding to latch circuits with holding data of significant values among the M latch circuits included in the first row selecting section, and
the second row selecting section sequentially outputs the control signals at a constant time interval to a plurality of rows corresponding to latch circuits with holding data of significant values among the M latch circuits included in the second row selecting section.

* * * * *